US012277368B2

(12) United States Patent
Plagge et al.

(10) Patent No.: US 12,277,368 B2
(45) Date of Patent: *Apr. 15, 2025

(54) HANDLING OF LOSS OF PAIRING BETWEEN NETWORKED DEVICES

(71) Applicant: Sonos, Inc., Santa Barbara, CA (US)

(72) Inventors: Mark Plagge, Santa Barbara, CA (US); Simon Jarvis, Cambridge, MA (US); Christopher Butts, Evanston, IL (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,244

(22) Filed: Aug. 14, 2023

(65) Prior Publication Data
US 2024/0078085 A1 Mar. 7, 2024

Related U.S. Application Data

(63) Continuation of application No. 17/353,254, filed on Jun. 21, 2021, now Pat. No. 11,726,742, which is a
(Continued)

(51) Int. Cl.
G06F 3/16 (2006.01)
G10L 15/30 (2013.01)
(Continued)

(52) U.S. Cl.
CPC .............. G06F 3/167 (2013.01); G10L 15/30 (2013.01); H04L 12/2803 (2013.01);
(Continued)

(58) Field of Classification Search
USPC ....... 704/246, 247, 251, 252, 268, 275, 270, 704/270.1
See application file for complete search history.

(56) References Cited

U.S. PATENT DOCUMENTS 999,715 A 8/1911 Gundersen
5,717,768 A 2/1998 Laroche
(Continued)

FOREIGN PATENT DOCUMENTS

CN 1323435 A 11/2001
CN 1748250 A 3/2006
(Continued)

OTHER PUBLICATIONS

Advisory Action mailed on Nov. 7, 2022, issued in connection with U.S. Appl. No. 16/168,389, filed Oct. 23, 2018, 4 pages.
(Continued)

Primary Examiner — Leonard Saint-Cyr

(57) ABSTRACT

Systems and methods disclosed herein include (i) receiving a voice command via at least one microphone of a networked microphone device, wherein the networked microphone device is configured to receive voice commands for a media playback system, and wherein the media playback system comprises the networked microphone device and a first playback device configured to play back content, (ii) determining that the networked microphone device is not configured to play back the content, (iii) in response to determining that the networked microphone is not configured to play back the content, determining that the first playback device is available to play back the content, (iv) causing the first playback device to play back the content, (v) determining that the first playback device is no longer available to play back the content, and (vi) selecting a second playback device to play back the content.

17 Claims, 7 Drawing Sheets

Related U.S. Application Data continuation of application No. 16/715,984, filed on Dec. 16, 2019, now Pat. No. 11,042,355, which is a continuation of application No. 15/131,254, filed on Apr. 18, 2016, now Pat. No. 10,509,626.

(60) Provisional application No. 62/312,350, filed on Mar. 23, 2016, provisional application No. 62/298,425, filed on Feb. 22, 2016, provisional application No. 62/298,393, filed on Feb. 22, 2016, provisional application No. 62/298,388, filed on Feb. 22, 2016, provisional application No. 62/298,439, filed on Feb. 22, 2016, provisional application No. 62/298,418, filed on Feb. 22, 2016, provisional application No. 62/298,433, filed on Feb. 22, 2016, provisional application No. 62/298,350, filed on Feb. 22, 2016.

(51) Int. Cl.
*H04L 12/28* (2006.01)
*H04L 12/40* (2006.01)
*H04L 67/10* (2022.01)
*H04L 67/561* (2022.01)
*G10L 15/22* (2006.01)
*H04L 41/0668* (2022.01)
*H04L 43/0817* (2022.01)

(52) U.S. Cl.
CPC ........ *H04L 12/40052* (2013.01); *H04L 67/10* (2013.01); *H04L 67/561* (2022.05); *G10L 2015/223* (2013.01); *G10L 2015/225* (2013.01); *H04L 2012/2849* (2013.01); *H04L 41/0668* (2013.01); *H04L 43/0817* (2013.01)

(56) References Cited

U.S. PATENT DOCUMENTS

| | | |
|---|---|---|
| 5,857,172 A | 1/1999 | Rozak |
| 6,070,140 A | 5/2000 | Tran |
| 6,219,645 B1 | 4/2001 | Byers |
| 7,516,068 B1 | 4/2009 | Clark |
| 7,705,565 B2 | 4/2010 | Patino et al. |
| 8,085,947 B2 | 12/2011 | Haulick et al. |
| 8,233,632 B1 | 7/2012 | Macdonald et al. |
| 8,325,909 B2 | 12/2012 | Tashev et al. |
| 8,437,481 B2 * | 5/2013 | Johnson ............ H03G 3/001 381/98 |
| 8,489,398 B1 | 7/2013 | Gruenstein |
| 8,594,320 B2 | 11/2013 | Faller |
| 8,620,232 B2 | 12/2013 | Helsloot |
| 8,639,214 B1 | 1/2014 | Fujisaki |
| 8,676,273 B1 | 3/2014 | Fujisaki |
| 8,719,039 B1 | 5/2014 | Sharifi |
| 8,762,156 B2 | 6/2014 | Chen |
| 8,768,712 B1 | 7/2014 | Sharifi |
| 8,898,063 B1 | 11/2014 | Sykes et al. |
| 9,002,024 B2 | 4/2015 | Nakadai et al. |
| 9,047,857 B1 | 6/2015 | Barton |
| 9,070,367 B1 | 6/2015 | Hoffmeister et al. |
| 9,088,336 B2 | 7/2015 | Mani et al. |
| 9,183,845 B1 | 11/2015 | Gopalakrishnan et al. |
| 9,313,317 B1 | 4/2016 | Lebeau et al. |
| 9,354,687 B2 | 5/2016 | Bansal et al. |
| 9,443,516 B2 | 9/2016 | Katuri et al. |
| 9,491,033 B1 | 11/2016 | Soyannwo et al. |
| 9,514,747 B1 | 12/2016 | Bisani et al. |
| 9,532,139 B1 | 12/2016 | Lu et al. |
| 9,542,941 B1 | 1/2017 | Weksler et al. |
| 9,558,755 B1 | 1/2017 | Laroche et al. |
| 9,640,194 B1 | 5/2017 | Nemala et al. |
| 9,672,812 B1 | 6/2017 | Watanabe et al. |
| 9,691,384 B1 | 6/2017 | Wang et al. |
| 9,706,320 B2 | 7/2017 | Starobin et al. |
| 9,749,738 B1 | 8/2017 | Adsumilli et al. |
| 9,756,422 B2 | 9/2017 | Paquier et al. |
| 9,767,786 B2 | 9/2017 | Starobin et al. |
| 9,781,532 B2 | 10/2017 | Sheen |
| 9,799,330 B2 | 10/2017 | Nemala et al. |
| 9,812,128 B2 | 11/2017 | Mixter et al. |
| 9,875,740 B1 | 1/2018 | Kumar et al. |
| 9,898,250 B1 | 2/2018 | Williams et al. |
| 9,899,021 B1 | 2/2018 | Vitaladevuni et al. |
| 9,992,642 B1 | 6/2018 | Rapp et al. |
| 10,028,069 B1 | 7/2018 | Lang |
| 10,038,419 B1 | 7/2018 | Elliot et al. |
| 10,134,398 B2 | 11/2018 | Sharifi |
| 10,157,042 B1 | 12/2018 | Jayakumar et al. |
| 10,186,276 B2 | 1/2019 | Dewasurendra et al. |
| 10,204,624 B1 | 2/2019 | Knudson et al. |
| 10,241,754 B1 | 3/2019 | Kadarundalagi Raghuram Doss et al. |
| 10,249,205 B2 | 4/2019 | Hammersley et al. |
| 10,304,440 B1 | 5/2019 | Panchapagesan et al. |
| 10,304,475 B1 | 5/2019 | Wang et al. |
| 10,318,236 B1 | 6/2019 | Pal et al. |
| 10,332,508 B1 | 6/2019 | Hoffmeister |
| 10,354,658 B2 | 7/2019 | Wilberding |
| 10,424,296 B2 | 9/2019 | Penilla et al. |
| 10,565,999 B2 | 1/2020 | Wilberding |
| 10,565,998 B2 | 2/2020 | Wilberding |
| 10,567,515 B1 | 2/2020 | Bao |
| 10,580,405 B1 | 3/2020 | Wang et al. |
| 10,586,534 B1 | 3/2020 | Argyropoulos et al. |
| 10,593,328 B1 | 3/2020 | Wang et al. |
| 10,593,330 B2 | 3/2020 | Sharifi |
| 10,699,711 B2 | 6/2020 | Reilly |
| 10,720,173 B2 | 7/2020 | Freeman et al. |
| 10,735,870 B2 | 8/2020 | Ballande et al. |
| 10,746,840 B1 | 8/2020 | Barton et al. |
| 10,748,531 B2 | 8/2020 | Kim |
| 10,777,203 B1 | 9/2020 | Pasko |
| 10,789,041 B2 | 9/2020 | Kim et al. |
| 10,824,682 B2 | 11/2020 | Alvares et al. |
| 10,825,471 B2 | 11/2020 | Walley et al. |
| 10,837,667 B2 | 11/2020 | Nelson et al. |
| 10,847,137 B1 | 11/2020 | Mandal et al. |
| 10,847,164 B2 | 11/2020 | Wilberding |
| 10,867,604 B2 | 12/2020 | Smith et al. |
| 10,871,943 B1 | 12/2020 | D'Amato et al. |
| 10,878,811 B2 | 12/2020 | Smith et al. |
| 10,885,091 B1 | 1/2021 | Meng et al. |
| 10,911,596 B1 | 2/2021 | Do et al. |
| 10,964,314 B2 | 3/2021 | Jazi et al. |
| 11,024,311 B2 | 6/2021 | Mixter et al. |
| 11,025,569 B2 | 6/2021 | Lind et al. |
| 11,050,615 B2 | 6/2021 | Mathews et al. |
| 11,062,705 B2 | 7/2021 | Watanabe et al. |
| 11,100,923 B2 | 8/2021 | Fainberg et al. |
| 11,127,405 B1 | 9/2021 | Antos et al. |
| 11,137,979 B2 | 10/2021 | Plagge |
| 11,138,969 B2 | 10/2021 | D'Amato |
| 11,159,878 B1 | 10/2021 | Chatlani et al. |
| 11,172,328 B2 | 11/2021 | Soto et al. |
| 11,172,329 B2 | 11/2021 | Soto et al. |
| 11,175,880 B2 | 11/2021 | Liu et al. |
| 11,184,704 B2 | 11/2021 | Jarvis et al. |
| 11,184,969 B2 | 11/2021 | Lang |
| 11,206,052 B1 | 12/2021 | Park et al. |
| 11,212,612 B2 | 12/2021 | Lang et al. |
| 11,264,019 B2 | 3/2022 | Bhattacharya et al. |
| 11,277,512 B1 | 3/2022 | Leeds et al. |
| 11,315,556 B2 | 4/2022 | Smith et al. |
| 11,354,092 B2 | 6/2022 | D'Amato et al. |
| 11,361,763 B1 | 6/2022 | Maas et al. |
| 11,373,645 B1 | 6/2022 | Mathew et al. |
| 11,411,763 B2 | 8/2022 | Mackay et al. |
| 11,445,301 B2 | 9/2022 | Park et al. |
| 11,475,899 B2 | 10/2022 | Lesso |
| 11,514,898 B2 | 11/2022 | Millington |
| 11,531,520 B2 | 12/2022 | Wilberding |
| 2002/0054685 A1 | 5/2002 | Avendano et al. |
| 2002/0055950 A1 | 5/2002 | Witteman |

(56) References Cited

U.S. PATENT DOCUMENTS

| | | |
|---|---|---|
| 2002/0143532 A1 | 10/2002 | McLean et al. |
| 2003/0097482 A1 | 5/2003 | DeHart et al. |
| 2004/0153321 A1 | 8/2004 | Chung et al. |
| 2004/0161082 A1 | 8/2004 | Brown et al. |
| 2006/0104454 A1 | 5/2006 | Guitarte Perez et al. |
| 2007/0038461 A1 | 2/2007 | Abbott et al. |
| 2007/0060054 A1 | 3/2007 | Romesburg |
| 2007/0286426 A1 | 12/2007 | Xiang et al. |
| 2008/0008333 A1 | 1/2008 | Nishikawa et al. |
| 2008/0031466 A1 | 2/2008 | Buck et al. |
| 2008/0144858 A1 | 6/2008 | Khawand et al. |
| 2008/0160977 A1 | 7/2008 | Ahmaniemi et al. |
| 2008/0192946 A1 | 8/2008 | Faller |
| 2008/0291916 A1 | 11/2008 | Xiong et al. |
| 2009/0013255 A1 | 1/2009 | Yuschik et al. |
| 2009/0046866 A1 | 2/2009 | Feng et al. |
| 2009/0113053 A1 | 4/2009 | Van Wie et al. |
| 2009/0214048 A1 | 8/2009 | Stokes, III et al. |
| 2009/0232481 A1* | 9/2009 | Baalbergen ........ H04N 21/8455 386/328 |
| 2009/0299745 A1 | 12/2009 | Kennewick et al. |
| 2009/0323924 A1 | 12/2009 | Tashev et al. |
| 2010/0041443 A1 | 2/2010 | Yokota |
| 2010/0070276 A1 | 3/2010 | Wasserblat et al. |
| 2010/0179806 A1 | 7/2010 | Zhang et al. |
| 2010/0260348 A1 | 10/2010 | Bhow et al. |
| 2010/0278351 A1 | 11/2010 | Fozunbal et al. |
| 2010/0299639 A1 | 11/2010 | Ramsay et al. |
| 2010/0329472 A1 | 12/2010 | Nakadai et al. |
| 2010/0332236 A1 | 12/2010 | Tan |
| 2011/0019833 A1 | 1/2011 | Kuech et al. |
| 2011/0176687 A1 | 7/2011 | Birkenes |
| 2012/0009906 A1 | 1/2012 | Patterson et al. |
| 2012/0020485 A1 | 1/2012 | Visser et al. |
| 2012/0027218 A1 | 2/2012 | Every et al. |
| 2012/0076308 A1 | 3/2012 | Kuech et al. |
| 2012/0224457 A1 | 9/2012 | Kim et al. |
| 2012/0237047 A1 | 9/2012 | Neal et al. |
| 2012/0245941 A1 | 9/2012 | Cheyer |
| 2012/0265528 A1 | 10/2012 | Gruber et al. |
| 2012/0288100 A1 | 11/2012 | Cho |
| 2013/0073293 A1 | 3/2013 | Jang et al. |
| 2013/0080167 A1 | 3/2013 | Mozer |
| 2013/0080171 A1 | 3/2013 | Mozer et al. |
| 2013/0129100 A1 | 5/2013 | Sorensen |
| 2013/0185639 A1 | 7/2013 | Lim |
| 2013/0230184 A1 | 9/2013 | Kuech et al. |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1 | 11/2013 | Yoo et al. |
| 2013/0301840 A1 | 11/2013 | Yemdji et al. |
| 2013/0322634 A1 | 12/2013 | Bennett et al. |
| 2013/0336499 A1 | 12/2013 | Beckhardt et al. |
| 2014/0056435 A1 | 2/2014 | Kjems et al. |
| 2014/0064476 A1 | 3/2014 | Mani et al. |
| 2014/0108010 A1 | 4/2014 | Maltseff et al. |
| 2014/0126745 A1 | 5/2014 | Dickins et al. |
| 2014/0159581 A1 | 6/2014 | Pruemmer et al. |
| 2014/0161263 A1 | 6/2014 | Koishida et al. |
| 2014/0167929 A1 | 6/2014 | Shim et al. |
| 2014/0172899 A1 | 6/2014 | Hakkani-Tur et al. |
| 2014/0181199 A1 | 6/2014 | Kumar et al. |
| 2014/0188476 A1 | 7/2014 | Li et al. |
| 2014/0200881 A1 | 7/2014 | Chatlani |
| 2014/0229959 A1 | 8/2014 | Beckhardt et al. |
| 2014/0244269 A1 | 8/2014 | Tokutake |
| 2014/0270216 A1 | 9/2014 | Tsilfidis et al. |
| 2014/0278343 A1 | 9/2014 | Tran |
| 2014/0278445 A1 | 9/2014 | Eddington, Jr. |
| 2014/0288686 A1 | 9/2014 | Sant et al. |
| 2014/0324203 A1 | 10/2014 | Coburn, IV et al. |
| 2014/0328490 A1 | 11/2014 | Mohammad et al. |
| 2014/0330896 A1 | 11/2014 | Addala et al. |
| 2014/0364089 A1 | 12/2014 | Lienhart et al. |
| 2014/0365225 A1 | 12/2014 | Haiut |
| 2014/0368734 A1 | 12/2014 | Hoffert et al. |
| 2015/0030172 A1 | 1/2015 | Gaensler et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0073807 A1 | 3/2015 | Kumar |
| 2015/0088500 A1 | 3/2015 | Conliffe |
| 2015/0126255 A1 | 5/2015 | Yang et al. |
| 2015/0154953 A1 | 6/2015 | Bapat et al. |
| 2015/0170665 A1 | 6/2015 | Gundeti et al. |
| 2015/0200923 A1 | 7/2015 | Triplett |
| 2015/0221307 A1 | 8/2015 | Shah et al. |
| 2015/0373100 A1 | 12/2015 | Kravets et al. |
| 2015/0382128 A1 | 12/2015 | Ridihalgh et al. |
| 2016/0014536 A1 | 1/2016 | Sheen |
| 2016/0018873 A1 | 1/2016 | Fernald et al. |
| 2016/0027440 A1 | 1/2016 | Gelfenbeyn et al. |
| 2016/0034448 A1 | 2/2016 | Tran |
| 2016/0055847 A1 | 2/2016 | Dahan |
| 2016/0066087 A1 | 3/2016 | Solbach et al. |
| 2016/0077794 A1 | 3/2016 | Kim et al. |
| 2016/0093281 A1 | 3/2016 | Kuo et al. |
| 2016/0118048 A1 | 4/2016 | Heide |
| 2016/0134924 A1 | 5/2016 | Bush et al. |
| 2016/0148612 A1 | 5/2016 | Guo et al. |
| 2016/0192099 A1 | 6/2016 | Oishi et al. |
| 2016/0212488 A1 | 7/2016 | Os et al. |
| 2016/0299737 A1 | 10/2016 | Clayton et al. |
| 2016/0323863 A1* | 11/2016 | Park ........................ H04W 4/70 |
| 2016/0335485 A1 | 11/2016 | Kim |
| 2016/0379635 A1 | 12/2016 | Page |
| 2017/0025124 A1 | 1/2017 | Mixter et al. |
| 2017/0040002 A1 | 2/2017 | Basson et al. |
| 2017/0083606 A1 | 3/2017 | Mohan |
| 2017/0084278 A1 | 3/2017 | Jung |
| 2017/0110130 A1 | 4/2017 | Sharifi et al. |
| 2017/0140750 A1 | 5/2017 | Wang et al. |
| 2017/0140757 A1 | 5/2017 | Penilla et al. |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0242656 A1 | 8/2017 | Plagge et al. |
| 2017/0269900 A1 | 9/2017 | Triplett |
| 2017/0269975 A1 | 9/2017 | Wood et al. |
| 2017/0300289 A1 | 10/2017 | Gattis |
| 2017/0329397 A1 | 11/2017 | Lin |
| 2017/0331869 A1 | 11/2017 | Bendahan et al. |
| 2017/0332035 A1 | 11/2017 | Shah et al. |
| 2017/0357390 A1 | 12/2017 | Alonso Ruiz et al. |
| 2017/0364371 A1 | 12/2017 | Nandi et al. |
| 2017/0365247 A1 | 12/2017 | Ushakov |
| 2018/0012077 A1 | 1/2018 | Laska et al. |
| 2018/0018965 A1 | 1/2018 | Daley |
| 2018/0033429 A1 | 2/2018 | Makke et al. |
| 2018/0061409 A1 | 3/2018 | Valentine et al. |
| 2018/0096678 A1 | 4/2018 | Zhou et al. |
| 2018/0120947 A1 | 5/2018 | Wells et al. |
| 2018/0137857 A1 | 5/2018 | Zhou et al. |
| 2018/0139512 A1 | 5/2018 | Moran et al. |
| 2018/0158454 A1 | 6/2018 | Campbell et al. |
| 2018/0182410 A1 | 6/2018 | Kaskari et al. |
| 2018/0190274 A1 | 7/2018 | Kirazci et al. |
| 2018/0196776 A1 | 7/2018 | Hershko et al. |
| 2018/0199130 A1 | 7/2018 | Jaffe et al. |
| 2018/0233141 A1 | 8/2018 | Solomon et al. |
| 2018/0233150 A1 | 8/2018 | Gruenstein et al. |
| 2018/0260680 A1 | 9/2018 | Finkelstein et al. |
| 2018/0270573 A1 | 9/2018 | Lang et al. |
| 2018/0270575 A1 | 9/2018 | Akutagawa |
| 2018/0293221 A1 | 10/2018 | Finkelstein et al. |
| 2018/0301147 A1 | 10/2018 | Kim |
| 2018/0330727 A1 | 11/2018 | Tulli |
| 2018/0336892 A1 | 11/2018 | Kim et al. |
| 2018/0350356 A1 | 12/2018 | Garcia |
| 2018/0350379 A1 | 12/2018 | Wung et al. |
| 2018/0352014 A1 | 12/2018 | Alsina et al. |
| 2018/0352334 A1 | 12/2018 | Family et al. |

(56) References Cited

U.S. PATENT DOCUMENTS

| | | |
|---|---|---|
| 2018/0356962 A1 | 12/2018 | Corbin |
| 2018/0358019 A1 | 12/2018 | Mont-Reynaud |
| 2019/0019112 A1 | 1/2019 | Gelfenbeyn et al. |
| 2019/0035404 A1 | 1/2019 | Gabel et al. |
| 2019/0037173 A1 | 1/2019 | Lee |
| 2019/0044745 A1 | 2/2019 | Knudson et al. |
| 2019/0051299 A1 | 2/2019 | Ossowski et al. |
| 2019/0066680 A1 | 2/2019 | Woo et al. |
| 2019/0066687 A1 | 2/2019 | Wood et al. |
| 2019/0066710 A1 | 2/2019 | Bryan et al. |
| 2019/0073999 A1 | 3/2019 | Prémont et al. |
| 2019/0096408 A1 | 3/2019 | Li et al. |
| 2019/0122662 A1 | 4/2019 | Chang et al. |
| 2019/0156847 A1 | 5/2019 | Bryan et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0188328 A1 | 6/2019 | Oyenan et al. |
| 2019/0189117 A1 | 6/2019 | Kumar |
| 2019/0206405 A1 | 7/2019 | Gillespie et al. |
| 2019/0219976 A1 | 7/2019 | Giorgi et al. |
| 2019/0237089 A1 | 8/2019 | Shin |
| 2019/0251960 A1 | 8/2019 | Maker et al. |
| 2019/0259408 A1 | 8/2019 | Freeman et al. |
| 2019/0281387 A1 | 9/2019 | Woo et al. |
| 2019/0287536 A1 | 9/2019 | Sharifi et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0347063 A1 | 11/2019 | Liu et al. |
| 2019/0364422 A1 | 11/2019 | Zhuo |
| 2019/0371310 A1 | 12/2019 | Fox et al. |
| 2019/0371324 A1 | 12/2019 | Powell et al. |
| 2019/0371329 A1 | 12/2019 | D'Souza et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0066279 A1 | 2/2020 | Kang et al. |
| 2020/0075018 A1 | 3/2020 | Chen |
| 2020/0098379 A1 | 3/2020 | Tai et al. |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0135224 A1 | 4/2020 | Bromand et al. |
| 2020/0152206 A1 | 5/2020 | Shen et al. |
| 2020/0184964 A1 | 6/2020 | Myers et al. |
| 2020/0244650 A1 | 7/2020 | Burris et al. |
| 2020/0251107 A1 | 8/2020 | Wang et al. |
| 2020/0265842 A1 | 8/2020 | Singh |
| 2020/0342869 A1 | 10/2020 | Lee et al. |
| 2020/0366477 A1 | 11/2020 | Brown et al. |
| 2020/0409926 A1 | 12/2020 | Srinivasan et al. |
| 2021/0029452 A1 | 1/2021 | Tsoi et al. |
| 2021/0118439 A1 | 4/2021 | Schillmoeller et al. |
| 2021/0249004 A1 | 8/2021 | Smith |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |
| 2023/0019595 A1 | 1/2023 | Smith |

FOREIGN PATENT DOCUMENTS

| | | |
|---|---|---|
| CN | 1781291 A | 5/2006 |
| CN | 101427154 A | 5/2009 |
| CN | 102999161 A | 3/2013 |
| CN | 104115224 A | 10/2014 |
| CN | 104155938 A | 11/2014 |
| CN | 104282305 A | 1/2015 |
| CN | 104520927 A | 4/2015 |
| CN | 104572009 A | 4/2015 |
| CN | 104581510 A | 4/2015 |
| CN | 104885406 A | 9/2015 |
| CN | 104885438 A | 9/2015 |
| CN | 105101083 A | 11/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 105679318 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108028047 A | 5/2018 |
| CN | 108028048 A | 5/2018 |
| CN | 108198548 A | 6/2018 |
| EP | 3142107 A1 | 3/2017 |
| GB | 2501367 A | 10/2013 |
| JP | S63301998 A | 12/1988 |
| JP | H0883091 A | 3/1996 |
| JP | 2004096520 A | 3/2004 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2017129860 A | 7/2017 |
| JP | 2017227912 A | 12/2017 |
| JP | 2018055259 A | 4/2018 |
| JP | 2019109510 A | 7/2019 |
| KR | 101284134 B1 | 7/2013 |
| KR | 20140005410 A | 1/2014 |
| KR | 20140054643 A | 5/2014 |
| KR | 20140111859 A | 9/2014 |
| TW | 201629950 A | 8/2016 |
| WO | 03054854 A2 | 7/2003 |
| WO | 2008096414 A1 | 8/2008 |
| WO | 2015133022 A1 | 9/2015 |
| WO | 2015195216 A1 | 12/2015 |
| WO | 2016003509 A1 | 1/2016 |
| WO | 2016014686 A1 | 1/2016 |
| WO | 2016136062 A1 | 9/2016 |
| WO | 2018140777 A1 | 8/2018 |
| WO | 2019005772 A1 | 1/2019 |

OTHER PUBLICATIONS

Advisory Action mailed on Feb. 28, 2022, issued in connection with U.S. Appl. No. 16/813,643, filed Mar. 9, 2020, 3 pages.

Australian Patent Office, Australian Examination Report Action mailed on Nov. 10, 2022, issued in connection with Australian Application No. 2018312989, 2 pages.

Australian Patent Office, Australian Examination Report Action mailed on Jul. 11, 2023, issued in connection with Australian Application No. 2022246446, 2 pages.

Australian Patent Office, Australian Examination Report Action mailed on Jun. 14, 2023, issued in connection with Australian Application No. 2019299865, 2 pages.

Australian Patent Office, Australian Examination Report Action mailed on May 19, 2022, issued in connection with Australian Application No. 2021212112, 2 pages.

(56) References Cited

OTHER PUBLICATIONS

Australian Patent Office, Australian Examination Report Action mailed on Sep. 25, 2023, issued in connection with Australian Application No. 2018338812, 3 pages.
Australian Patent Office, Australian Examination Report Action mailed on Sep. 28, 2022, issued in connection with Australian Application No. 2018338812, 3 pages.
Australian Patent Office, Australian Examination Report Action mailed on Oct. 31, 2023, issued in connection with Australian Application No. 2023203687, 2 pages.
Australian Patent Office, Australian Examination Report Action mailed on Mar. 4, 2022, issued in connection with Australian Application No. 2021202786, 2 pages.
Canadian Patent Office, Canadian Examination Report mailed on Dec. 1, 2021, issued in connection with Canadian Application No. 3096442, 4 pages.
Canadian Patent Office, Canadian Examination Report mailed on Oct. 12, 2023, issued in connection with Canadian Application No. 3084279, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jun. 7, 2022, issued in connection with Canadian Application No. 3105494, 5 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Dec. 30, 2022, issued in connection with Chinese Application No. 201880076775.3, 10 pages.
Chinese Patent Office, First Office Action and Translation mailed on Sep. 6, 2023, issued in connection with Chinese Application No. 202010179593.8, 14 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.
European Patent Office, European EPC Article 94.3 mailed on Oct. 12, 2023, issued in connection with European Application No. 20736489.4, 8 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 29, 2023, issued in connection with European Application No. 22182193.7, 4 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
Notice of Allowance mailed on Feb. 13, 2023, issued in connection with U.S. Appl. No. 18/045,360, filed Oct. 10, 2022, 9 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Aug. 14, 2023, issued in connection with U.S. Appl. No. 17/549,034, filed Dec. 13, 2021, 9 pages.
Notice of Allowance mailed on Jan. 14, 2022, issued in connection with U.S. Appl. No. 16/966,397, filed Jul. 30, 2020, 5 pages.

(56) References Cited

OTHER PUBLICATIONS

Notice of Allowance mailed on Sep. 14, 2023, issued in connection with U.S. Appl. No. 18/061,579, filed Dec. 5, 2022, 7 pages.
Notice of Allowance mailed on Aug. 15, 2022, issued in connection with U.S. Appl. No. 17/101,949, filed Nov. 23, 2020, 11 pages.
Notice of Allowance mailed on Feb. 15, 2023, issued in connection with U.S. Appl. No. 17/659,613, filed Apr. 18, 2022, 21 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2022, issued in connection with U.S. Appl. No. 16/736,725, filed on Jan. 1, 2020, 11 pages.
Notice of Allowance mailed on Aug. 16, 2023, issued in connection with U.S. Appl. No. 17/536,572, filed Nov. 29, 2021, 7 pages.
Notice of Allowance mailed on Aug. 17, 2022, issued in connection with U.S. Appl. No. 17/135,347, filed Dec. 28, 2020, 14 pages.
Notice of Allowance mailed on Nov. 17, 2022, issued in connection with U.S. Appl. No. 17/486,222, filed Sep. 27, 2021, 10 pages.
Notice of Allowance mailed on Jul. 18, 2022, issued in connection with U.S. Appl. No. 17/222,151, filed Apr. 5, 2021, 5 pages.
Notice of Allowance mailed on Dec. 2, 2021, issued in connection with U.S. Appl. No. 16/841,116, filed Apr. 6, 2020, 5 pages.
Notice of Allowance mailed on Oct. 2, 2023, issued in connection with U.S. Appl. No. 17/810,533, filed Jul. 1, 2022, 8 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Aug. 21, 2023, issued in connection with U.S. Appl. No. 17/548,921, filed Dec. 13, 2021, 10 pages.
Notice of Allowance mailed on Dec. 21, 2021, issued in connection with U.S. Appl. No. 16/271,550, filed Feb. 8, 2019, 11 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Sep. 21, 2022, issued in connection with U.S. Appl. No. 17/128,949, filed Dec. 21, 2020, 8 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Feb. 23, 2023, issued in connection with U.S. Appl. No. 17/532,674, filed Nov. 22, 2021, 10 pages.
Notice of Allowance mailed on Mar. 24, 2022, issued in connection with U.S. Appl. No. 16/378,516, filed Apr. 8, 2019, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2022, issued in connection with U.S. Appl. No. 17/145,667, filed Jan. 11, 2021, 8 pages.
Notice of Allowance mailed on Oct. 26, 2022, issued in connection with U.S. Appl. No. 17/486,574, filed Sep. 27, 2021, 11 pages.
Notice of Allowance mailed on Jun. 27, 2022, issued in connection with U.S. Appl. No. 16/812,758, filed Mar. 9, 2020, 16 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2022, issued in connection with U.S. Appl. No. 17/327,911, filed May 24, 2021, 14 pages.
Notice of Allowance mailed on Jul. 29, 2022, issued in connection with U.S. Appl. No. 17/236,559, filed Apr. 21, 2021, 6 pages.
Notice of Allowance mailed on Mar. 29, 2023, issued in connection with U.S. Appl. No. 17/722,438, filed Apr. 18, 2022, 7 pages.
Notice of Allowance mailed on Sep. 29, 2023, issued in connection with U.S. Appl. No. 16/168,389, filed Oct. 23, 2018, 11 pages.
Notice of Allowance mailed on Mar. 3, 2022, issued in connection with U.S. Appl. No. 16/679,538, filed Nov. 11, 2019, 7 pages.
Notice of Allowance mailed on Jun. 30, 2023, issued in connection with U.S. Appl. No. 17/303,001, filed May 18, 2021, 8 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Jun. 30, 2022, issued in connection with European Application No. 21212763.3, 9 pages.
European Patent Office, European Extended Search Report mailed on Jul. 8, 2022, issued in connection with European Application No. 22153523.0, 9 pages.
European Patent Office, European Search Report mailed on Mar. 1, 2022, issued in connection with European Application No. 21180778.9, 9 pages.
European Patent Office, European Search Report mailed on Oct. 4, 2022, issued in connection with European Application No. 22180226.7, 6 pages.
European Patent Office, European Search Report mailed on Sep. 21, 2023, issued in connection with European Application No. 23172783.5, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Final Office Action mailed on Jun. 1, 2022, issued in connection with U.S. Appl. No. 16/806,747, filed Mar. 2, 2020, 20 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.

(56) References Cited

OTHER PUBLICATIONS

Final Office Action mailed on May 17, 2023, issued in connection with U.S. Appl. No. 16/168,389, filed Oct. 23, 2018, 44 pages.
Final Office Action mailed on Mar. 21, 2022, issued in connection with U.S. Appl. No. 16/153,530, filed Oct. 5, 2018, 23 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Final Office Action mailed on Aug. 25, 2023, issued in connection with U.S. Appl. No. 16/989,350, filed Aug. 10, 2020, 21 pages.
Final Office Action mailed on Jul. 27, 2022, issued in connection with U.S. Appl. No. 16/989,350, filed Aug. 10, 2020, 15 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Oct. 4, 2021, issued in connection with U.S. Appl. No. 16/806,747, filed Mar. 2, 2020, 17 pages.
Final Office Action mailed on Oct. 6, 2023, issued in connection with U.S. Appl. No. 17/532,744, filed Nov. 22, 2021, 21 pages.
Final Office Action mailed on Jun. 7, 2022, issued in connection with U.S. Appl. No. 16/736,725, filed Jan. 7, 2020, 14 pages.
Final Office Action mailed on Aug. 9, 2023, issued in connection with U.S. Appl. No. 17/493,430, filed Oct. 4, 2021, 19 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Search Report and Written Opinion mailed on Mar. 20, 2023, issued in connection with International Application No. PCT/US2022/045399, filed on Sep. 30, 2022, 25 pages.
International Searching Authority, Invitation to Pay Additional Fees on Jan. 27, 2023, issued in connection with International Application No. PCT/US2022/045399, filed on Sep. 30, 2022, 19 pages.

Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Nov. 28, 2021, issued in connection with Japanese Patent Application No. 2020-550102, 9 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action and Translation mailed on Nov. 15, 2022, issued in connection with Japanese Patent Application No. 2021-146144, 9 pages.
Japanese Patent Office, Office Action mailed on Dec. 7, 2021, issued in connection with Japanese Patent Application No. 2020-513852, 6 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Nov. 29, 2021, issued in connection with U.S. Appl. No. 16/989,350, filed Aug. 10, 2020, 15 pages.
Non-Final Office Action mailed on Jul. 3, 2023, issued in connection with U.S. Appl. No. 17/135,173, filed Dec. 28, 2020, 22 pages.
Non-Final Office Action mailed on Sep. 30, 2022, issued in connection with U.S. Appl. No. 17/353,254, filed Jun. 21, 2021, 22 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Oct. 6, 2023, issued in connection with U.S. Appl. No. 17/222,950, filed Apr. 5, 2021, 9 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.

(56) References Cited

OTHER PUBLICATIONS

Non-Final Office Action mailed on Sep. 7, 2023, issued in connection with U.S. Appl. No. 17/340,590, filed Jun. 7, 2021, 18 pages.
Non-Final Office Action mailed on Feb. 8, 2022, issued in connection with U.S. Appl. No. 16/806,747, filed Mar. 2, 2020, 17 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Feb. 1, 2022, issued in connection with U.S. Appl. No. 16/439,046, filed Jun. 12, 2019, 9 pages.
Notice of Allowance mailed on Mar. 1, 2022, issued in connection with U.S. Appl. No. 16/879,549, filed May 20, 2020, 9 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on Aug. 11, 2023, issued in connection with U.S. Appl. No. 17/878,649, filed Aug. 1, 2022, 7 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2021, issued in connection with U.S. Appl. No. 16/879,553, filed May 20, 2020, 15 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Office Action and Translation mailed on Feb. 27, 2023, issued in connection with Korean Application No. 10-2022-7021879, 5 pages.
Mathias Wolfel. Channel Selection by Class Separability Measures for Automatic Transcriptions on Distant Microphones, INTERSPEECH 2007 10.21437/Interspeech.2007-255, 4 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Aug. 10, 2023, issued in connection with U.S. Appl. No. 18/070,024, filed Nov. 28, 2022, 4 pages.
Non-Final Office Action mailed on Feb. 11, 2022, issued in connection with U.S. Appl. No. 17/145,667, filed Jan. 11, 2021, 9 pages.
Non-Final Office Action mailed on Apr. 12, 2023, issued in connection with U.S. Appl. No. 17/878,649, filed Aug. 1, 2022, 16 pages.
Non-Final Office Action mailed on Oct. 13, 2021, issued in connection with U.S. Appl. No. 16/679,538, filed Nov. 11, 2019, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2022, issued in connection with U.S. Appl. No. 17/446,690, filed Sep. 1, 2021, 10 pages.
Non-Final Office Action mailed on Sep. 14, 2023, issued in connection with U.S. Appl. No. 17/528,843, filed Nov. 17, 2021, 20 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.

(56) References Cited

OTHER PUBLICATIONS

Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Jul. 18, 2023, issued in connection with U.S. Appl. No. 18/066,093, filed Dec. 14, 2022, 12 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 19, 2022, issued in connection with U.S. Appl. No. 17/385,542, filed Jul. 26, 2021, 9 pages.
Non-Final Office Action mailed on Apr. 20, 2023, issued in connection with U.S. Appl. No. 18/061,570, filed Dec. 5, 2022, 12 pages.
Non-Final Office Action mailed on Oct. 20, 2022, issued in connection with U.S. Appl. No. 17/532,674, filed Nov. 22, 2021, 52 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on Oct. 23, 2023, issued in connection with U.S. Appl. No. 17/932,715, filed Sep. 16, 2022, 14 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Notice of Allowance mailed on Mar. 30, 2023, issued in connection with U.S. Appl. No. 17/303,066, filed May 19, 2021, 7 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on Aug. 4, 2023, issued in connection with U.S. Appl. No. 18/145,520, filed Dec. 22, 2022, 10 pages.
Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.
Notice of Allowance mailed on Apr. 8, 2022, issued in connection with U.S. Appl. No. 16/813,643, filed Mar. 9, 2020, 7 pages.
Notice of Allowance mailed on Nov. 8, 2021, issued in connection with U.S. Appl. No. 17/008,104, filed Aug. 31, 2020, 9 pages.
Notice of Allowance mailed on Nov. 8, 2023, issued in connection with U.S. Appl. No. 18/066,093, filed Dec. 14, 2022, 11 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Pre-Appeal Brief Decision mailed on Jan. 18, 2022, issued in connection with U.S. Appl. No. 16/806,747, filed Mar. 2, 2020, 2 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Tsung-Hsien Wen et al: "A Network-based End-to-End Trainable Task-oriented Dialogue System", CORR (ARXIV), vol. 1604.04562v1, Apr. 15, 2016 (Apr. 15, 2016), pp. 1-11.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. INTERSPEECH, TALP Research Center, Jan. 2010, 5 pages.
Wölfel et al. Multi-source far-distance microphone selection and combination for automatic transcription of lectures, INTERSPEECH 2006—ICSLP, Jan. 2006, 5 pages.
Zhang et al. Noise Robust Speech Recognition Using Multi-Channel Based Channel Selection And Channel Weighting. The Institute of Electronics, Information and Communication Engineers, arXiv:1604.03276v1 [cs.SD] Jan. 1, 2010, 8 pages.

* cited by examiner

HANDLING OF LOSS OF PAIRING BETWEEN NETWORKED DEVICES

CROSS-REFERENCE TO RELATED APPLICATIONS

This application claims the benefit of priority under 35 U.S.C. § 120 to U.S. patent application Ser. No. 17,353,254, filed on Jun. 21, 2021, titled "Handling of loss of pairing between networked devices," the contents of which is incorporated by reference herein in its entirety. U.S. patent application Ser. No. 17,353,254 claims priority to U.S. patent application Ser. No. 16,715,984, filed Dec. 16, 2019, titled "Handling of loss of pairing between networked devices," the contents of which is incorporated by reference herein in its entirety. U.S. patent application Ser. No. 16,715,984 claims priority to U.S. patent application Ser. No. 15,131,254, filed Apr. 18, 2016, titled "Handling of loss of pairing between networked devices," the contents of which is incorporated by reference herein in its entirety. U.S. patent application Ser. No. 15,131,254 claims priority to (i) U.S. Provisional App. 62/298,418, filed Feb. 22, 2016, titled "Audio Response Playback;" (ii) U.S. Provisional App. 62/298,433, filed Feb. 22, 2016, titled "Room-corrected Voice Detection;" (iii) U.S. Provisional App. 62/298,439, filed Feb. 22, 2016, titled "Content Mixing;" (iv) U.S. Provisional App. 62/298,425, filed Feb. 22, 2016, titled "Music Service Selection;" (v) U.S. Provisional App. 62/298,350, filed Feb. 22, 2016, titled "Metadata exchange involving a networked playback system and a networked microphone system;" (vi) U.S. Provisional App. 62/298,388, filed Feb. 22, 2016, titled "Handling of loss of pairing between networked devices;" (vii) U.S. Provisional App. 62/298,393, filed Feb. 22, 2016, titled "Action based on User ID;" and (viii) U.S. Provisional App. 62/312,350, filed Mar. 23, 2016, titled "Voice Control of a Media Playback System." The entire contents of the 62/298,418; 62/298,433; 62/298,439; 62/298,425; 62/298,350; 62/298,388; 62/298,393; and 62/312,350 applications are incorporated herein by reference. This application also incorporates by reference the entire contents of U.S. Provisional App. 62/298,410, filed Feb. 22, 2016, and titled "Default Playback Device(s)."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
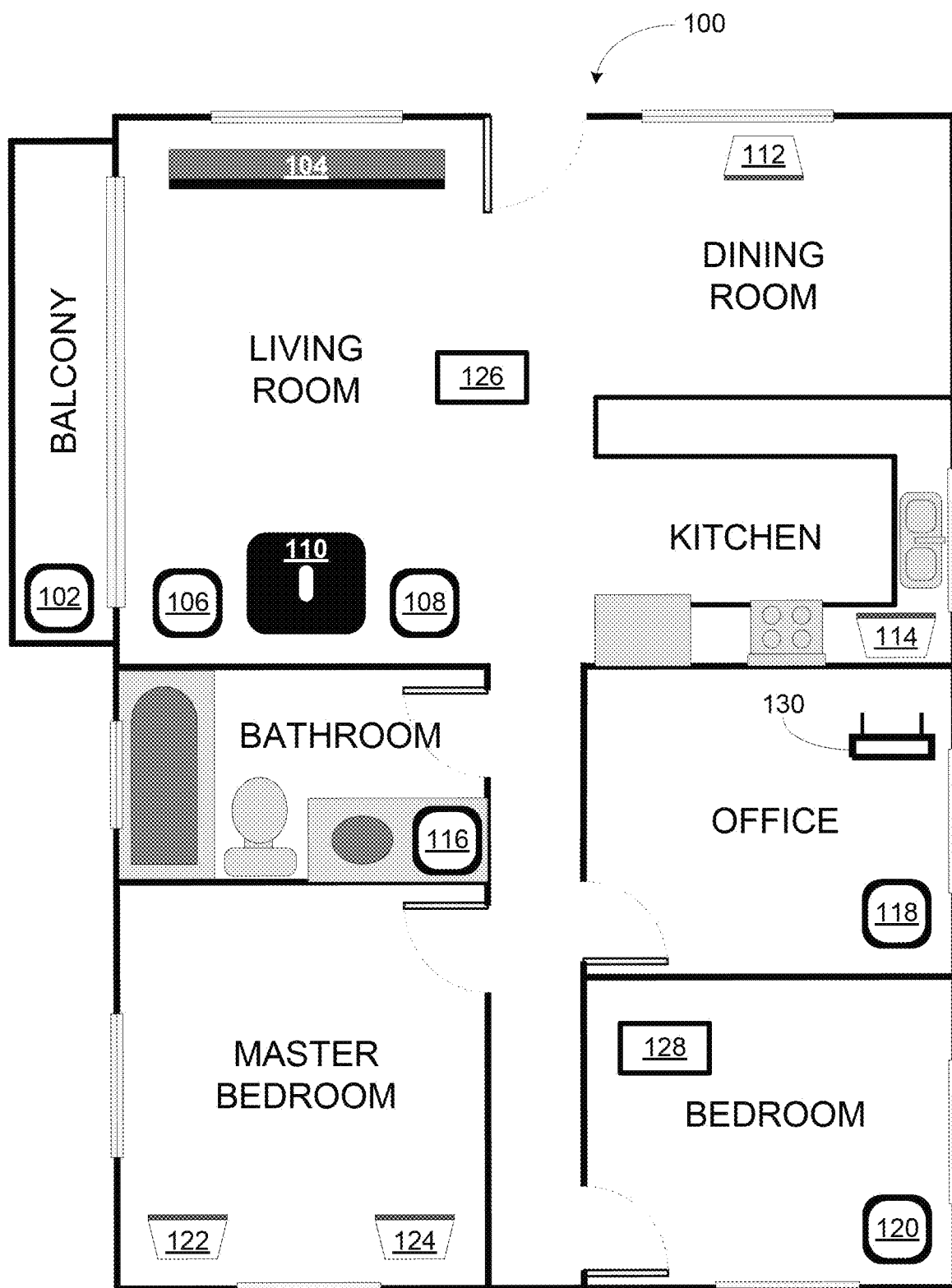
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

When a media playback system is configured to be controlled by voice commands received via a networked microphone system, it is advantageous for the media playback system to execute the voice commands and to perhaps also provide feedback in response to a voice command received via the networked microphone system.

For example, in response to the networked microphone system receiving a voice command to "Add this song to my favorites playlist," it is advantageous for the media playback system (or at least one media playback device of the media playback system) to add the song to the favorites playlist and also to confirm that the song has been added to the user's favorite's playlist via some audio feedback, such as "[Song name] has been added to the favorite's playlist" or some similar feedback. Similarly, in response to the networked microphone system receiving a voice command of "What is the name of this song?", it may be desirable for the media playback system (or at least one media playback device of the media playback system) to inform the user of the name of the song via some audio feedback, such as "This song is 'All You Need is Love' by The Beatles," or some similar feedback.

However, sometimes one or more media playback devices may be unavailable or otherwise unable to execute a voice command (e.g., a command to play back media, reconfigure the media playback system, and so on) or to provide feedback in response to the networked microphone system receiving a voice command. In such circumstances, it may be desirable to have a fallback device to play back media, perform media playback system reconfigurations, and/or provide feedback in response to a voice command received via the networked microphone system.

Some embodiments described herein include (i) receiving a voice command via a networked microphone device configured to receive voice commands for a media playback system to perform a function (e.g., play back media content, add or remove a song from a playlist, purchase a song, and so on), wherein the media playback system comprises a primary media playback device configured to perform the function in response to voice commands received via the networked microphone device, (ii) determining that the primary media playback device is not available to perform the function in response to the voice command, and (iii) in response to determining that the primary media playback device is not available to perform the function in response to the voice command, instructing a fallback device to perform the function in response to the voice command.

Some embodiments described herein may additionally or alternatively include (i) receiving a voice command via a networked microphone device configured to receive voice commands for a media playback system, wherein the media playback system comprises a primary media playback device configured to provide a first feedback in response to voice commands received via the networked microphone device, (ii) determining that the primary media playback device is not available to provide the first feedback in response to the voice command, and (iii) in response to determining that the primary media playback device is not available to provide the first feedback in response to the voice command, instructing a fallback device to provide a second feedback in response to the voice command.

Additionally, sometimes one or more networked microphone devices of a networked microphone system may be unavailable or otherwise unable to receive voice commands. In such circumstances, it may be desirable to configure a fallback microphone (perhaps temporarily) to receive voice commands for the media playback system.

Some embodiments described herein include (i) determining that a primary networked microphone device of a networked microphone system is not available to receive voice commands for a media playback system, wherein the media playback system comprises one or more media playback devices, and (ii) in response to determining that the primary networked microphone device is not available to receive voice commands, designating a fallback microphone to receive voice commands for the media playback system.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
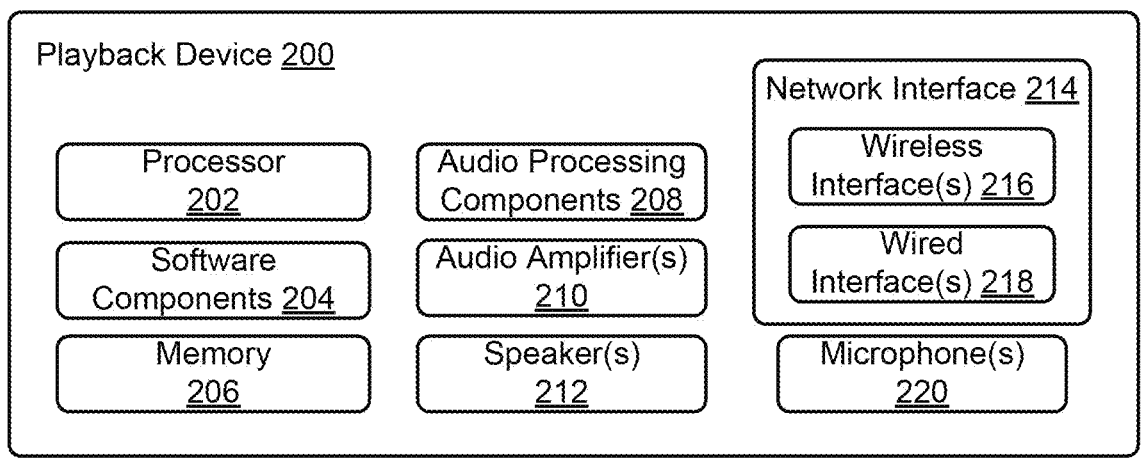
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the one or more processors 202 may be one or more clock-driven computing components configured to process input data according to instructions stored in the memory 206. The memory 206 may be a tangible computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
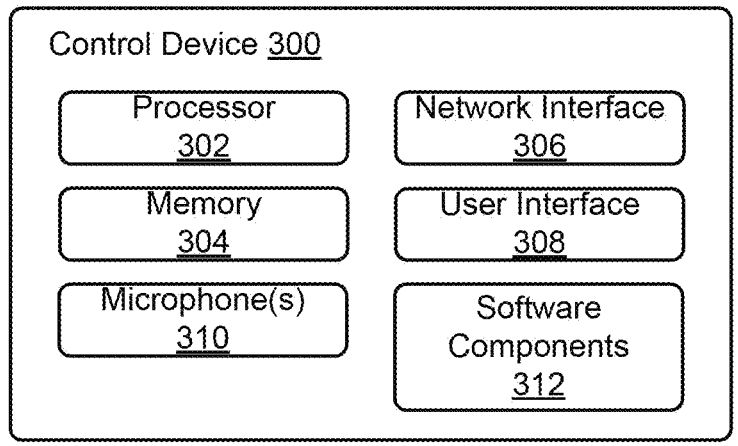
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac'™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others.

Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
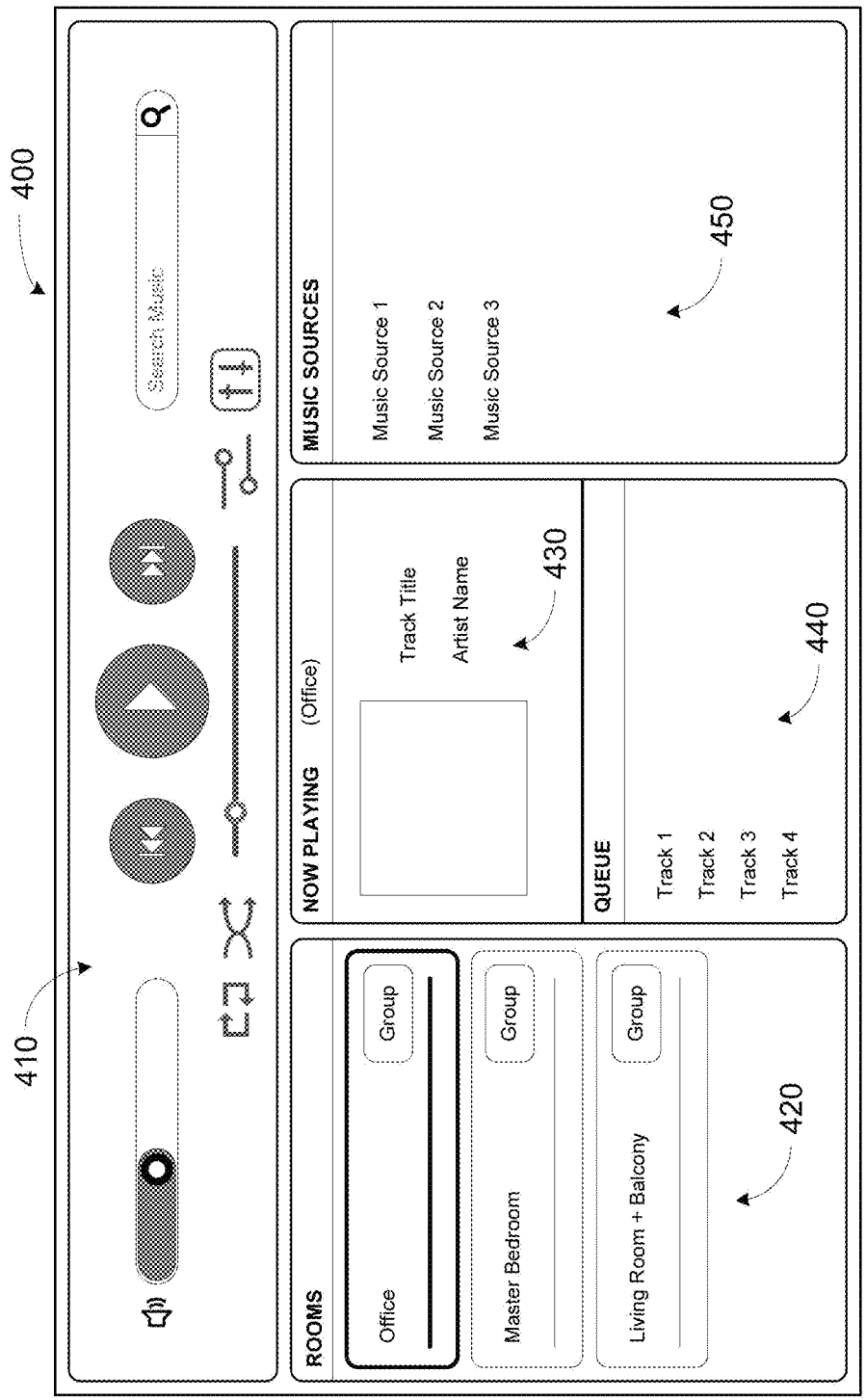
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
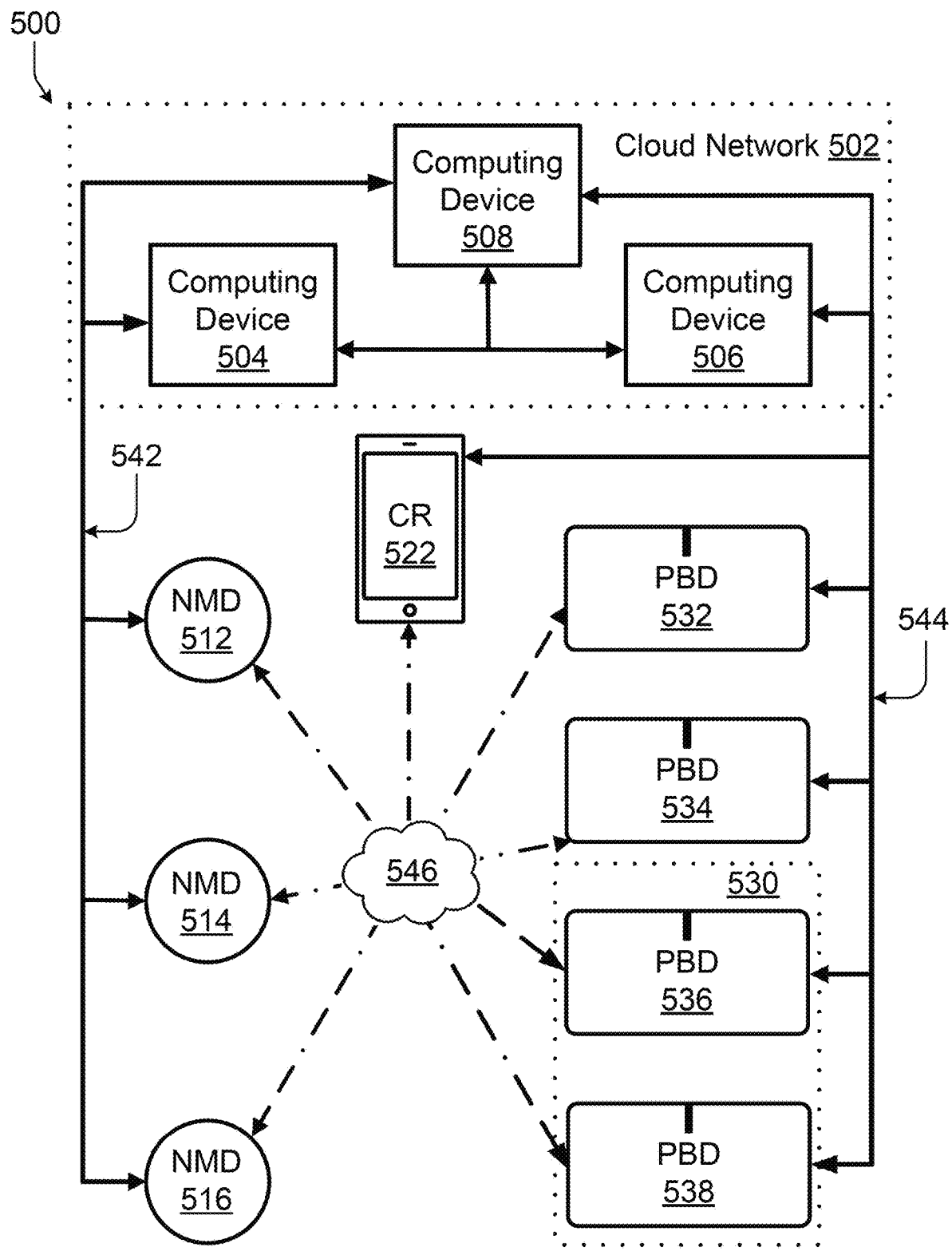
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional (or fewer) devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
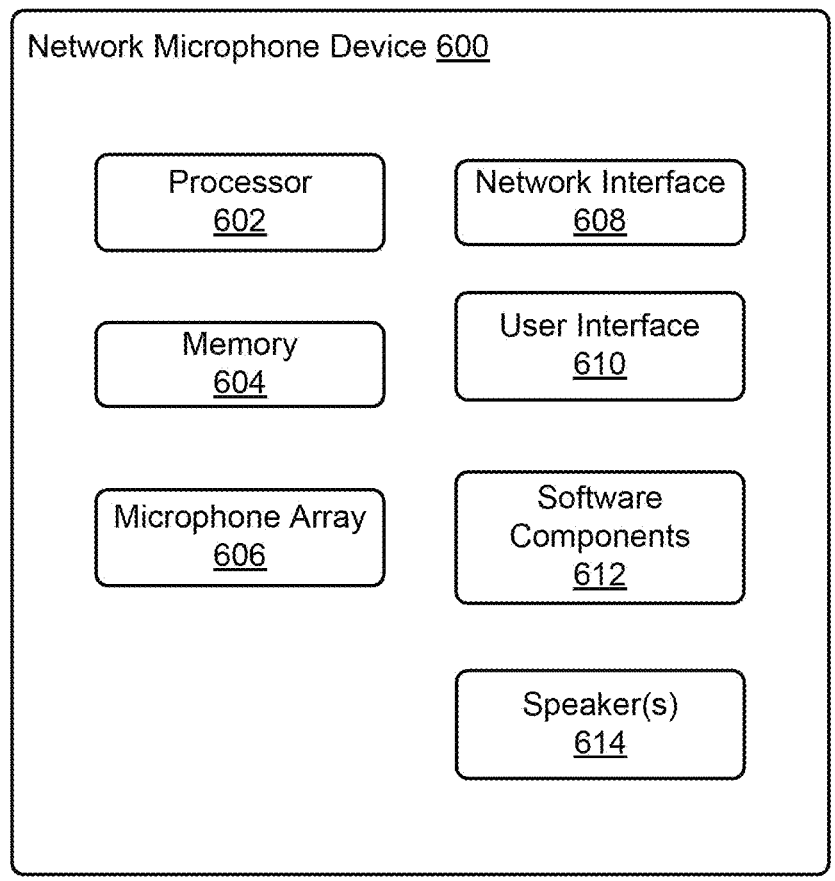
FIG. 6 shows a function block diagram of an example network microphone device.

FIG. 6 shows a function block diagram of an example network microphone device 600 that may be configured to be one or more of NMDs 512, 514, and 516 of FIG. 5. As shown, the network microphone device 600 includes one or more processors 602, memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods

In some embodiments, it is desirable for one of the media playback devices (such as any of PBDs 532-538) of the media playback system to perform functions and/or provide feedback in response to a voice command received via a networked microphone device (any of NMDs 512-516) of the networked microphone system.

In the context of this disclosure, performing a function may include any action taken by any one or more components of the media playback system in response to a voice command. For example, in response to a voice command to "Play Led Zeppelin" received via the networked microphone system, the media playback system (or perhaps one or more PBDs of the media playback system) performs the function of playing a song by the band Led Zeppelin. In another example, in response to a voice command to "Combine the kitchen and living zones into a synchrony group" received via the networked microphone system, the media playback system (or perhaps one or more PBDs of the media playback system, individually or in combination with CR 522 and/or computing device 506) may configure the PBDs in the kitchen zone and the living room zone into a synchrony group, wherein after configuring the PBDs in the kitchen and living room zones into a synchrony group, the PBDs in the kitchen zone and the PBDs in the living room zone are configured to play back media in synchrony with each other, as described herein.

In the context of this disclosure, feedback is some audible, visual, tangible, or other type of response to a voice command. For example, in response to a voice command of "What is the current temperature outside?", the networked microphone system may instruct one or more of the PBDs in the media playback system to respond with the current outdoor temperature. In some embodiments, this feedback may be an audible statement of "The current temperature is 75 degrees" that is played by one of the PBDs of the media playback system. Similarly, in response to a voice command of "What is the name of this song?", the networked microphone system may instruct one or more of the PBDs of the media playback system to respond with the title of the song. In some embodiments, this feedback may be an audible statement of "The current song is All You Need is Love by The Beatles" that is played by one of the PBDs of the media playback system. Instead of audible feedback, in some embodiments, the feedback may be visual or tangible/haptic, as described herein.

In some embodiments, a particular PBD of the media playback system is designated as a primary PBD for a particular NMD of the networked microphone system. In operation, the primary PBD for a particular NMD is the PBD that is configured to perform functions and/or provide feedback to voice commands received by that particular NMD. In some embodiments, different NMDs may have different corresponding primary PBDs. For example, the primary PBD for an NMD located in the kitchen zone might be a PBD also located in the kitchen zone. Similarly, the primary PBD for an NMD located in the bedroom zone might be a PBD also located in the bedroom zone. In other embodiments, a single PBD may be the primary PBD for the networked microphone system. In still further embodiments, a computing device configured to control the media playback system may act as the primary PBD in terms of performing functions and/or providing feedback to voice commands received via one or more NMDs of the networked microphone system.

In operation, an NMD of the networked microphone system receives a voice command. The voice command may be any type of command or request for information. If a response (i.e., feedback) to the voice command is desirable or perhaps even required, then the networked microphone system instructs the media playback system to provide feedback (and perhaps also the content of the feedback) in response to the voice command.

In some embodiments, to instruct the media playback system to provide feedback in response to a voice command, the networked microphone system first determines whether the primary PBD associated with the NMD that received the voice command is available to provide feedback in response to the voice command. Alternatively, some embodiments may include the networked microphone system instructing the primary PBD associated with the NMD that received the voice command to provide the feedback in response to the voice command without first checking whether the primary PBD is available to provide feedback in response to the voice command.

In operation, determining whether the primary PBD associated with the NMD that received the voice command is available to provide feedback in response to the voice command may include determining whether the primary PBD associated with the NMD that received the voice command is one or more of: (i) muted, (ii) in a do not interrupt state, (iii) in a power save mode, (iv) unreachable via a network configured to support communications between the media playback system and the NMD, (v) unplugged, or (vi) powered off. The primary PBD may alternatively be unavailable if the primary PBD has been moved from its typical location so that providing feedback in response to the voice command might not be helpful. For example, if the primary PBD for a particular NMD in the kitchen was moved from the kitchen to the bedroom, then it may not be helpful for the primary PBD to provide feedback in response to voice command received via the NMD in the kitchen because a user in the kitchen might not hear feedback from the primary PBD while the primary PBD is in the bedroom. In some embodiments, the networked microphone system may determine that the primary PBD is unavailable after the networked microphone system instructs the primary PBD to perform a function or provide feedback, but then the networked microphone system fails to receive a confirmation from the primary PBD that the primary PBD has performed the desired function or provided the desired feedback.

In some embodiments, the media playback system may inform the networked microphone system of the state (available vs. unavailable) of particular PBDs in the media playback system. For example, if the media playback system knows that PBD 534 is in a "do not interrupt" state because, for example, PBD 534 is playing audio content associated with a movie, then the media playback system may inform the networked microphone system that PBD 534 is unavailable but that PBDs 532, 536, and 538 are available. In some embodiments, the media playback system may inform the networked microphone system of the availability (or unavailability) of PBDs whenever a PBD changes state from available to unavailable or vice versa. In some embodiments, the media playback system may periodically or semi-periodically inform the networked microphone system as to which PBDs in the media playback system are available or not available. For example, the media playback system may inform the networked microphone system as to which PBDs are available or unavailable every few seconds, every few minutes, or on some other regular or semi-regular basis.

In operation, one or more components of media playback system (i.e., any of PBDs 532-538, CR 522, and/or computing device 506) may send state messaging to any one or more components of the networked microphone system (i.e., any of NMDs 512-516 and/or computing device 504) via any communication path between the media playback system and the networked microphone system. For example, PBD 532 may inform computing device 504 that PBD 532 is now available to perform functions and/or provide feedback in response to voice commands by sending state change messaging to one or more components of the networked microphone system via networks 546 and/or 542. In another example, computing device 506 may inform computing device 504 as to state (available vs. unavailable) of individual PBDs 532-538. In yet another example, CR 522 may inform one or more components of the networked microphone system as to the state (available vs. unavailable) of individual PBDs 532-538. The media playback system may inform the networked microphone system of PBD state changes in other ways too.

In some embodiments, the media playback system may inform the networked microphone system of the state (available vs. unavailable) of particular PBDs in the media playback system on an PBD by PBD and an NMD by NMD basis. For example, the media playback system may indicated that active PBDs in the kitchen are available to provide feedback in response to voice commands received from NMDs in the kitchen, but that active PBDs in other rooms are not available to provide feedback in response to voice commands received from NMDs in the kitchen.

In response to determining that the primary PBD associated with the NMD that received the voice command is available to perform a function and/or provide feedback in response to the voice command, the networked microphone system (e.g., any of NMDs 512-516 or computing device 504, individually or in combination) instructs the primary PBD to perform the function and/or provide a first feedback in response to the voice command.

In operation, the networked microphone system may instruct the primary PBD to perform the function called for in the voice command either directly or indirectly. For example, in some embodiments, one of the NMDs 512-516 may instruct the primary PBD directly via network 546 to perform the desired function. In other embodiments, one of the NMDs 512-516 may instruct CR 522 via network 546 to perform the function called for in the voice command, and CR 522 may then instruct the primary PBD to perform the function. In still further embodiments, computing device 504 may instruct computing device 506 to perform the function called for by the voice command, and computing device 506 may then instruct the primary PBD via network 544 to perform the function. In still further embodiments, computing device 504 may instruct CR 522 to perform the function called for by the voice command, and computing device 504 may then instruct the primary PBD to perform the function. In still further embodiments, computing device 504 may directly instruct the primary PBD to perform the function called for by the voice command. The networked microphone system may instruct the primary PBD to perform functions in other direct or indirect ways as well Similarly, in operation, the networked microphone system may instruct the primary PBD to provide the first feedback either directly or indirectly. For example, in some embodiments, one of the NMDs 512-516 may instruct the primary PBD directly via network 546 to provide the first feedback. In other embodiments, one of the NMDs 512-516 may instruct CR 522 via network 546 to provide feedback, and CR 522 may then instruct the primary PBD to provide the feedback. In still further embodiments, computing device 504 may instruct computing device 506 to provide feedback, and computing device 506 may then instruct the primary PBD via network 544 to provide the feedback. In still further embodiments, computing device 504 may instruct CR 522 to provide feedback, and computing device 504 may then instruct the primary PBD to provide the feedback. In still further embodiments, computing device 504 may directly instruct the primary PBD to provide the feedback. The networked microphone system may instruct the primary PBD to provide the first feedback in other direct or indirect ways as well.

In some embodiments, the networked microphone system instructing the primary PBD to provide the first feedback in response to the voice command may also include the networked microphone system providing the primary PBD with the content of the first feedback. For example, in response to the voice command of "What is the name of this band?", the networked microphone system (i.e., any of NMDs 512-516 or computing device 504, individually or in combination) may access metadata from the networked media system (i.e., from any of the PBDs 532-538 and computing device 506, individually or in combination) about the audio track that the media playback system is currently playing to determine the name of the band performing the currently playing track, and then instruct the primary PBD to provide audio feedback of "The name of the band is The Beatles."

But in response to determining that the primary PBD associated with the NMD that received the voice command is not available to perform functions or provide feedback in response to the voice commands, the networked microphone device may instruct a fallback device to perform the function or provide a second feedback in response to the voice command.

For example, if a particular NMD's primary PBD is unavailable to play back audio for some reason, then the networked microphone system (individually or in combination with the media playback system) may instruct a fallback PBD to play back the audio.

In some embodiments, when the voice command calls for feedback, the second feedback may be the same as the first feedback. For example, in response to the voice command of "What is the name of this band?", rather than the networked microphone system instructing the primary PBD to provide audio feedback of "The name of the band is The Beatles," the networked microphone system may instead instruct the fallback device to provide audio feedback of "The name of the band is The Beatles." In operation, the first feedback may be one or more of (i) an audio feedback, such as a voice response (e.g., "The name of the band is The Beatles"), a beep, or other audio indication, (ii) a visual feedback, such as a flashing light or other visual indication, and (iii) a haptic feedback, such as a vibration or other haptic indication.

But in other embodiments, the second feedback may be different than the first feedback. In operation, the second feedback may be any one or more of (i) an audio feedback, such as a voice response (e.g., "The name of the band is The Beatles"), a beep, or other audio indication, (ii) a visual feedback, such as a flashing light or other visual indication via the fallback device (e.g., a text message or application notification), and (iii) a haptic feedback, such as a vibration or other haptic or physical indication. Whether the second feedback is the same as or different than the first feedback may depend on whether the fallback device has the same output capabilities as the primary PBD. For example, some fallback devices may not have a speaker to provide audio feedback In some embodiments, the content of the second feedback may be different than the first feedback because the primary PBD is unavailable. For example, in the earlier scenario where the voice command is "What is this band?", the second feedback may be an audio indication from the fallback device that states "The primary playback device is offline; the name of the band is The Beatles."

In some embodiments, the fallback device that performs the function and/or provide the second feedback (depending on the content of the voice command) is at least one of (i) another PBD in the media playback system, (ii) a computing device configured to control the media playback system, such as CR 522, (iii) the NMD that received the voice command, and/or (iv) another NMD of the networked microphone system.

In some embodiments, the networked microphone system (i.e., any of NMDs 512-516 and computing device 504, individually or in combination) may select a fallback device from a set of one or more fallback devices. In other embodiments, the media playback system (i.e., any of PBDs 532-538, CR 522, and computing device 506, individually or in combination) may select a fallback device from a set of one or more fallback devices. In either scenario, selecting a fallback device from a set of one or more fallback devices comprises one of (i) selecting a fallback device according to a pre-defined hierarchy of fallback devices, (ii) selecting a fallback device from one or more media playback devices configured to playback media content in synchrony with the primary media playback device, (iii) selecting a fallback device from one or more media playback devices that were previously configured to playback media content in synchrony with the primary media playback device, or (iv) selecting a secondary media playback device as the fallback device, wherein the primary media playback device is configured to play back a first channel of media content and wherein the secondary media playback device is configured to play back a second channel of the media content.

For example, some embodiments may have a pre-defined hierarchy of fallback devices to select from. In some embodiments, the pre-defined hierarchy may be user configurable. In some embodiments, the pre-defined hierarchy may be configured by the manufacturer of the components of the media playback system and/or the manufacturer of the components of the networked microphone system. In some embodiments, the computing device 506 (or perhaps the computing device 504) may change the hierarchy of fallback devices from time to time as the configuration of the networked microphone system and/or the configuration of the media playback system changes over time.

According to one example hierarchy, one or both of the networked microphone system or the media playback system, individually or in combination, may first determine whether the primary PBD is a member of a bonded pair of PBDs, and if so, select the other PBD in the bonded pair as the fallback device.

But if the primary PBD is not a member of a bonded pair, then one or both of the networked microphone system or the media playback system, individually or in combination, may determine whether the primary PBD is a member of a synchrony group, and if so, select a fallback device from the other PBD(s) in the synchrony group.

But if the primary PBD is not a member of a bonded pair or a synchrony group, then one or both of the networked microphone system or the media playback system, individually or in combination, may determine whether the media playback device includes any other PBDs, and if so, select a fallback device from one of the other PBDs in the media playback system.

Then, if the primary PBD is not a member of a bonded pair or a synchrony group, and if the primary PBD is the only PBD in the media playback system, then one or both of the networked microphone system or the media playback system, individually or in combination, may determine whether the computing device configured to control the media playback system (e.g., CR 522) is active, and if so, select the computing device as fallback device. In operation, CR 522 may provide audio feedback from its own speakers, visual feedback on the screen (e.g., via the user interface application controlling the media playback system, via an application notification, via a text message, or via some other visual feedback), or haptic feedback (e.g., a vibration).

And finally, if the primary PBD is not a member of a bonded pair or a synchrony group, and if the primary PBD is the only PBD in the media playback system, and if the computing device configured to control the media playback system is not active, then one or both of the networked microphone system or the media playback system, individually or in combination, may determine whether other network devices outside of the media playback system are available to provide feedback, e.g., the NMD that received the voice command, other NMDs in the networked microphone system, networked televisions, networked clock radios, or other devices, and if so, select a fallback device from the set of available networked devices that are not part of the media playback system. Other pre-defined hierarchies of devices in any combination, order, or arrangement are possible as well.

Alternatively, rather than having a hierarchy of potential fallback devices, in some embodiments, one or both of the networked microphone system or the media playback system, individually or in combination, may be configured to select a fallback device from one or more other PBDs associated with the primary PBD, such as (i) one or more other PBDs in a consolidated media playback device with the primary PBD, (ii) one or more other PBDs in a bonded pair with the primary PBD, (iii) one or more other PBDs in a synchrony group with the primary PBD, (iv) one or more other PBDs that were previously in a consolidated playback device with the primary PBD, (v) one or more other PBDs that were previously in a bonded pair with the primary PBD, (vi) one or more other PBDs that were previously in a synchrony group with the primary PBD, (vii) one or more other PBDs that are in the media playback system with the primary PBD, (viii) one or more other PBDs that were previously in the media playback system with the primary PBD.

In some embodiments, the fallback device may additionally or alternatively indicate that the primary PBD is unavailable, such as via one or more of (i) an audio indication, (ii) a visual indication, and (iii) a haptic indication. For example, in addition to (or perhaps instead of) providing second feedback, the fallback device may indicate (e.g., inform the user) that the primary PBD that would ordinarily provide feedback in response to voice commands is currently unavailable to provide feedback in response to voice commands. In one example, the indication that the primary PBD is unavailable may be an audio indication that states, for example, "The primary playback device is currently unavailable." This indication could be an audio indication played out loud by any of (i) another PBD in the media playback system, (ii) a computing device configured to control the media playback system (e.g., CR 522), (iii) the NMD that received the voice command, (iv) another NMD in the networked microphone system, or (v) perhaps some other device in communication with the media playback system and/or the networked microphone system. Alternatively, the indication that the primary PBD is unavailable my be any other type of audible, visual, and/or haptic indication. For example, if the fallback device is CR 522, the indication that the primary PBD is unavailable may be a text message or application notification displayed on the screen of CR 522 and/or a vibration by the CR 522 device.

Some embodiments may additionally include the controller device (e.g., CR 522) and a PBD performing separate functions and/or providing separate feedback to the user when the primary PBD is not available to perform functions and/or provide feedback in response to voice commands. In one example, the networked microphone system receives a voice command to "Play All You Need is Love", and after determining that the primary PBD associated with the NMD that received the voice command is unavailable, the networked microphone system (alone or perhaps in combination with the media playback system) may both (i) instruct a fallback device to play the song and (ii) instruct the controller to display a message to the user that the primary PBD is unavailable. Thus, in this manner, the fallback device performs the function and another device provides feedback.

The above-described examples describe the networked microphone system (or perhaps the media playback system) selecting the fallback device. In operation, the networked microphone system selecting the fallback device may include any of the NMDs 512-516 or the computing device 504 (individually or in combination) selecting the fallback device. Similarly, the media playback system selecting the fallback device may include any of the PBDs 532-538, CR 522, or computing device 506 (individually or in combination) selecting the fallback device.

In addition to PBDs being available or unavailable to perform functions and/or provide feedback in response to voice commands, NMDs may also be available or unavailable to receive voice commands. Like the notion of individual NMDs having a primary PBD described above, in some embodiments, an individual PBD may have a corresponding primary NMD. For example, just like a particular NMD in the kitchen may have a corresponding primary PBD that is also in the kitchen, the PDB in the kitchen may have the NMD in the kitchen configured as its primary NMD. In this manner, a particular NMD might be paired with a particular PBD such that the NMD is the primary NMD for the PBD and the PBD is the primary PBD for the NMD. A formal software-based pairing between a NMD and a PBD is not required in all embodiments, but could be present in some embodiments.

Some embodiments include determining that a primary NMD of a networked microphone system is not available to receive voice commands for a media playback system having one or more PBDs. In operation, a primary NMD may be unavailable because the NMD is (i) in a do not interrupt state, (ii) in a power save mode, (iii) unreachable via a network configured to support communications between the media playback system and the NMD, (iv) unplugged, or (v) powered off. The primary NMD may alternatively be unavailable if it has been moved to a different room than its corresponding primary PBD (or if the NMD's corresponding primary PBD has been moved to a different room).

In response to determining that the primary NMD is not available to receive voice commands, one or both of the networked microphone system and the media playback system, individually or in combination, designates a fallback microphone to receive voice commands for the media playback system as a whole or for at least one PBD of the media playback system.

In some embodiments, determining that a primary NMD of the networked microphone system is not available to receive voice commands for the media playback system (or at least one PBD of the media playback system) includes the media playback system receiving a message from the networked microphone system indicating that the primary NMD is not available to receive voice commands. For some embodiments where individual PBDs in the media playback system each have corresponding primary NMDs in the networked microphone system, the networked microphone system may indicate which NMDs are available vs. unavailable to receive voice commands on a PBD by PBD basis.

In some embodiments, the networked microphone system may periodically or semi-periodically provide state information as to the availability or unavailability of individual NMDs of the networked microphone system to the media playback system.

In some embodiments, the networked microphone system may inform the media playback system of the state (available vs. unavailable) of particular NMDs in the networked microphone system. For example, if the networked microphone system knows that NMD 512 is in a "do not interrupt" state because, for example, NMD 512 is executing a software or firmware upgrade, then the networked microphone system may inform the media playback system that NMD 512 is unavailable but that NMDs 514 and 516 are available. In some embodiments, the networked microphone system may inform the media playback system of the availability (or unavailability) of NMDs whenever an NMD changes state from available to unavailable or vice versa. In some embodiments, the networked microphone system may periodically or semi-periodically inform the media playback system as to which NMDs in the networked microphone system are available or not available. For example, the networked microphone system may inform the media playback system as to which NMDs are available or unavailable every few seconds, every few minutes, or on some other regular or semi-regular basis.

In operation, one or more components of the networked microphone system (i.e., any of NMDs 512-516 and/or computing device 504) may send state messaging to any one or more components of the media playback system (i.e., any of PBDs 532-538, CR 522, and/or computing device 506) via any communication path between the networked microphone system and the media playback system. For example, NMD 512 may inform computing device 506 that NMD 512 is now available to receive voice commands by sending state change messaging to one or more components of the media playback system via networks 546 and/or 544. In another example, computing device 504 may inform computing device 506 as to state (available vs. unavailable) of individual NMDs 512-516. In yet another example, CR 522 may monitor the availability of NMDs 512-516 and inform one or more other components of the media playback system as to the state (available vs. unavailable) of individual NMDs 512-516. The networked microphone system may advise the media playback system of NMD state changes in other ways too.

In operation, one or both of the networked microphone system and the media playback system, individually or in combination, may designate one of a variety of available microphones as a fallback microphone to receive voice commands. For example, in some embodiments, the fallback microphone is a microphone on one of the PBDs in the media playback system. In other embodiments, the fallback microphone may be a microphone on a computing device configured to control the media playback system, such as CR 522 for example. In other embodiments, the fallback microphone may be a microphone on a secondary NMD of the networked microphone system. In still further embodiments, the fallback microphone may be a microphone on some other device in communication with one or both of the networked microphone system and/or the media playback system.

In some embodiments, one or both of the networked microphone system and the media playback system, individually or in combination, may select a fallback microphone according to a defined hierarchy. For example, in some embodiments, one or both of the networked microphone system and the media playback system, individually or in combination, may first determine whether the networked microphone system includes one or more additional NMDs, and if so, one or both of the networked microphone system and the media playback system, individually or in combination, may select one of the other NMDs of the networked microphone system as the fallback microphone for the media playback system (or select one of the other NMDs as the fallback microphone for one or more PBDs of the media playback system).

If the networked microphone system does not have any other NMDs, then one or both of the networked microphone system and the media playback system, individually or in combination, may select one of the PBDs of the media playback system to use its onboard microphone (if so equipped) as the fallback microphone for receiving voice commands for the media playback system (or for one or more PBDs of the media playback system). Next, if the networked microphone system does not have any additional NMDs, and if none of the PBDs in the media playback system have microphones, then one or both of the networked microphone system and the media playback system, individually or in combination, may select the computing device configured to control the media playback system (e.g., CF 522) to use its microphone as the fallback microphone for receiving voice commands for the media playback system (or at least for one or more PBDs of the media playback system).

And if the networked microphone system does not have any other NMDs, if none of the PBDs in the media playback system have a microphone (or if the microphones are not usable or if the PBDs are positioned in a location that makes its microphone unusable or at least undesirable for use because it is in a remote location of the house), and if the computing device configured to control the media playback system (e.g., CR 522) does not have a microphone (or if the microphone is in use by some other application running on CR 522, e.g., if CR 522 is engaged in a telephone call), then one or both of the networked microphone system and the media playback system, individually or in combination, may select some other device on the network with a microphone to use that microphone as a fallback microphone for receiving voice commands for the media playback system. Other hierarchies of fallback microphone selection could be used as well, including any combination of the above-described fallback microphones in any order. In some embodiments, the fallback microphone selection hierarchy may be user configurable.

In some embodiments, in response to determining that the primary NMD is not available to receive voice commands, one or both of the networked microphone system and the media playback system, individually or in combination, may additionally instruct another device to indicate that the primary NMD is unavailable. In operation, indicating that the primary NMD is unavailable comprises one or more of (i) an audio indication, (ii) a visual indication, and (iii) a haptic indication. In operation, the other device that indicates that the primary NMD is unavailable may include any of (i) any of the PBDs in the media playback system, (ii) another NMD in the networked microphone system, (iii) any computing device configured to control the media playback system, e.g., CR 522, or (iv) any other device in communication with the networked microphone system and/or the media playback system and configurable to provide or otherwise output an indication that the primary NMD is not available to receive voice commands.

Figure 7:
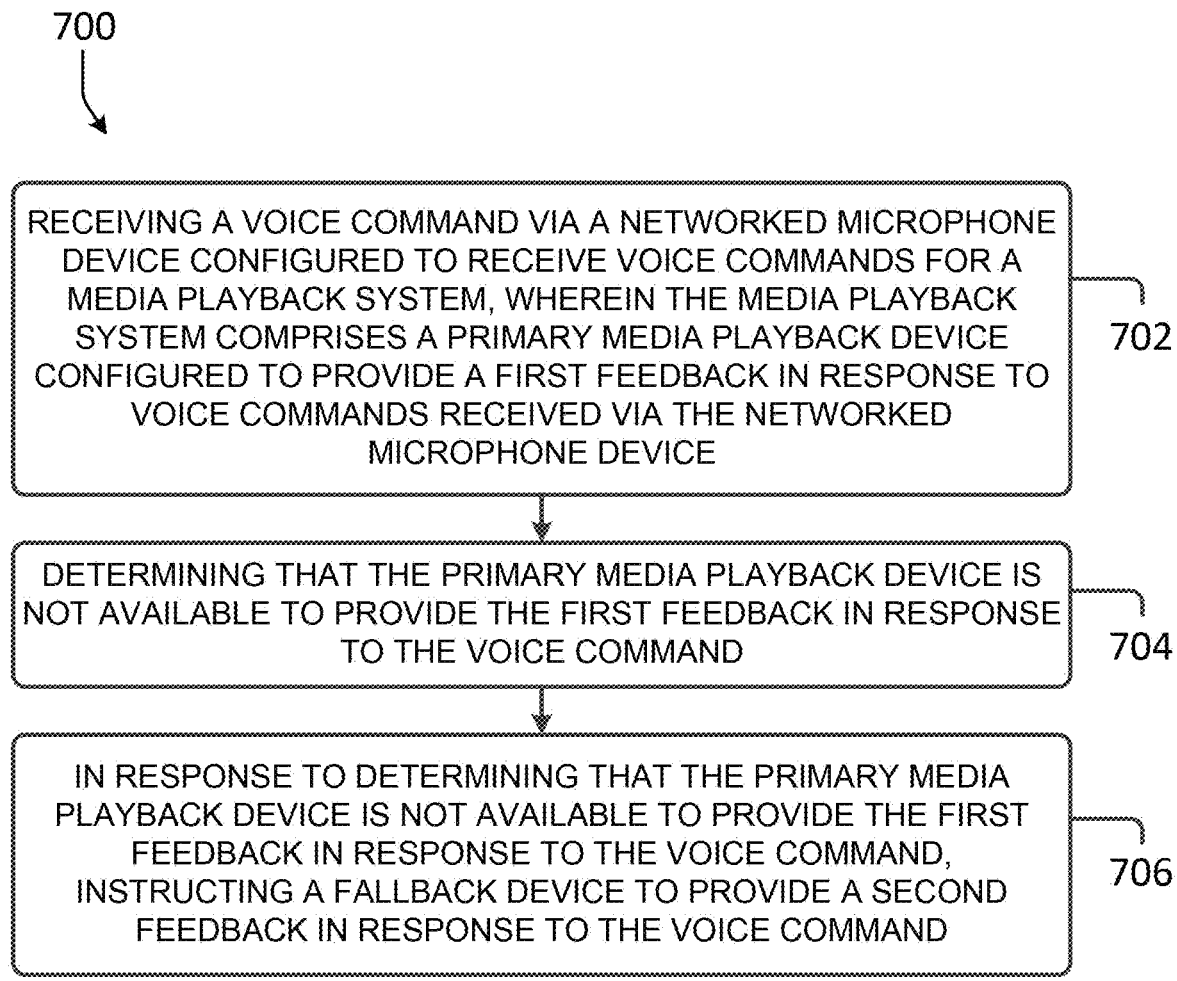
FIG. 7 shows an example method according to some embodiments.

Method 700 shown in FIG. 7 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the networked microphone device of FIG. 6. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

Method 700 begins at block 702, which includes receiving a voice command via a networked microphone device configured to receive voice commands for a media playback system, wherein the media playback system comprises a primary media playback device configured to provide a first feedback in response to voice commands received via the networked microphone device. In some embodiments, the first feedback is one or more of (i) an audio feedback, (ii) a visual feedback, and (iii) a haptic feedback as described herein.

In some embodiments, method block 702 may additionally or alternatively include receiving a voice command via a networked microphone device configured to receive voice commands for a media playback system, wherein the media playback system comprises a primary media playback device configured to perform a function in response to voice commands received via the networked microphone device. In some embodiments, the function is one or more of (i) a playback function, e.g., start/stop playback, skip a track, (ii) a playlist function, e.g., add/remove a track from a playlist, (iii) a playback device configuration function, e.g., raise/lower volume, change equalizer settings, (iv) a media playback system configuration function, e.g., group playback devices into a synchrony group, activate a zone scene, and/or (v) any other function that can be performed by a playback device individually or by the media playback system as a whole.

Next, method 700 advances to block 704, which includes determining that the primary media playback device is not available to provide the first feedback in response to the voice command. In some embodiments, method block 704 may additionally or alternatively include determining that the primary media playback device is not available to perform the function called for in the voice command.

In some embodiments, determining that the primary media playback device is not available to provide the first feedback and/or perform functions in response to the voice command comprises determining that the primary media playback device is one of (i) muted, (ii) in a do not interrupt state, (iii) in a power save mode, or (iv) unreachable via a network configured to support communications between the media playback system and the networked microphone device. In some embodiments, determining that the primary media playback device is not available to provide the first feedback and/or perform functions in response to the voice command comprises receiving a message from the media playback system indicating that the primary media playback device is not available.

In some embodiments, method 700 additionally includes the optional step of selecting a fallback device from a set of one or more fallback devices. In some embodiments, selecting a fallback device from a set of one or more fallback devices comprises one of (i) selecting a fallback device according to a pre-defined hierarchy of fallback devices, (ii) selecting a fallback device from one or more media playback devices configured to playback media content in synchrony with the primary media playback device, (iii) selecting a fallback device from one or more media playback devices that were previously configured to playback media content in synchrony with the primary media playback device, or (iv) selecting a secondary media playback device as the fallback device, wherein the primary media playback device is configured to play back a first channel of media content and wherein the secondary media playback device is configured to play back a second channel of the media content. The fallback device may be any one of (i) another media playback device of the media playback system, (ii) a computing device configured to control the media playback system, or (iii) the networked microphone device.

Finally, method 700 advances to block 706, which includes, in response to determining that the primary media playback device is not available to provide the first feedback in response to the voice command, instructing a fallback device to provide a second feedback in response to the voice command. In some embodiments, the second feedback is one or more of (i) an audio feedback, (ii) a visual feedback, and (iii) a haptic feedback as described herein. In some embodiments, the second feedback is the same as the first feedback.

In some embodiments, block 706 may additionally or alternative include, in response to determining that the primary media playback device is not available to perform functions in response to the voice command, instructing a fallback device to perform the function or functions called for in the voice command.

Some embodiments of method 700 may additionally include in response to determining that the primary media playback device is not available to provide the first feedback and/or perform functions in response to the voice command, additionally instructing the fallback device to indicate that the primary media playback device is unavailable, wherein indicating that the primary media playback device is unavailable comprises one or more of (i) an audio indication, (ii) a visual indication, and (iii) a haptic indication, as described herein.

Figure 8:
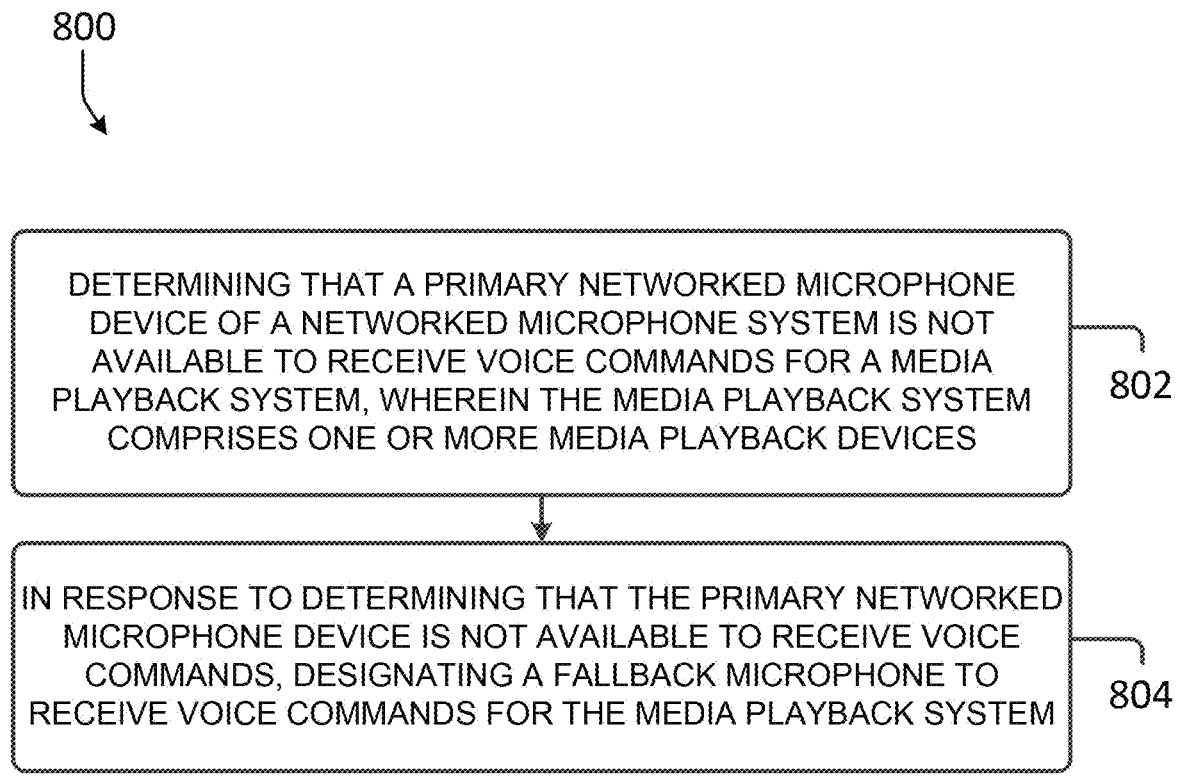
FIG. 8 shows an example method according to some embodiments.

Method 800 shown in FIG. 8 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the networked microphone device of FIG. 6. Method 800 may include one or more operations, functions, or actions as illustrated by one or more of blocks 802-804. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Method 800 begins at block 802, which includes determining that a primary networked microphone device of a networked microphone system is not available to receive voice commands for a media playback system, wherein the media playback system comprises one or more media playback devices.

In some embodiments, the primary networked microphone device may be unavailable to receive voice commands because the networked microphone device is (i) in a do not interrupt state, (ii) in a power save mode, (iii) unreachable via a network configured to support communications between the media playback system and the networked microphone device, (iv) unplugged, or (v) powered off. The primary networked microphone device may alternatively be unavailable if it has been moved to a different room than its corresponding primary media playback device (or if the networked microphone device's corresponding primary media playback device has been moved to a different room). In some embodiments, determining that a primary networked microphone device of a networked microphone system is not available to receive voice commands for a media playback system comprises receiving a message indicating that the primary microphone device is not available to receive voice commands.

Next, method 800 advances to block 804, which includes in response to determining that the primary networked microphone device is not available to receive voice commands, designating a fallback microphone to receive voice commands for the media playback system. In operation, the step of designating a fallback microphone to receive voice commands for the media playback system may be performed by any component(s) of the networked microphone system (e.g., with reference to FIG. 5, any of NMDs 512-516 or computing device 504, individually or in combination) or any component(s) of the media playback system (e.g., with reference to FIG. 5, any of PBDs 532-538, CR 522, or computing device 506, individually or in combination).

In operation, the fallback microphone may include any of (i) a microphone on a media playback device in the media playback system (e.g., a microphone on any of PBDs 532-538), (ii) a microphone on a computing device configured to control the media playback system (e.g., CR 522 in FIG. 5), (iii) a microphone on a secondary networked microphone device of the networked microphone system, or (iv) another microphone on another device in communication with the networked microphone system and/or the media playback system.

In some embodiments, method 800 may additionally or alternatively include the step of in response to determining that the primary networked microphone device is not available to receive voice commands, additionally instructing a computing device configured to control the media playback system to indicate that the primary networked microphone device is unavailable, wherein indicating that the primary networked microphone device is unavailable comprises one or more of (i) an audio indication, (ii) a visual indication, and (iii) a haptic indication, as described herein. Also, in some embodiments, method 800 may additionally or alternatively include the step of in response to determining that the primary networked microphone device is not available to receive voice commands, additionally instructing one or more media playback devices of the media playback system to indicate that the primary networked microphone device is unavailable, wherein indicating that the primary networked microphone device is unavailable comprises one or more of (i) an audio indication, (ii) a visual indication, and (iii) a haptic indication, as described herein.

IV. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:
at least one processor;
at least one non-transitory computer-readable medium; and
program instructions stored on the at least one non-transitory computer-readable medium that are executable by the at least one processor such that the system is configured to:
determine that a first playback device has detected a voice input comprising a voice command via at least one microphone of the first playback device, wherein the first playback device is configured to receive voice commands for a media playback system comprising the first playback device and a second playback device;
determine (i) a first portion of a response to the voice input comprising the command and (ii) a second portion of the response to the voice input comprising the command;
cause the first playback device to perform the first portion of the response to the voice input;
determine that the first playback device is not configured to perform the second portion of the response to the voice input;
determine that the second playback device is configured to perform the second portion of the response to the voice input; and
cause the second playback device to perform the second portion of the response to the voice input by (i) determining that a fallback device is configured to perform the second portion of the response and (ii) causing the fallback device to perform the second portion of the response to the voice input.

2. The system of claim 1, wherein the voice input is a first input comprising a first voice command, the system further comprising program instructions stored on the at least one non-transitory computer-readable medium that are executable by the at least one processor such that the system is configured to:
determine that the first playback device or the second playback device has detected a second voice input comprising a second voice command via at least one microphone of the first playback device or the second playback device;
determine (i) a first portion of a response to the second voice input and (ii) a second portion of the response to the second voice input;
determine that the first playback device is configured to perform the first portion of the response to the second voice input and the second portion of the response to the second voice input; and
cause the first playback device to perform the first portion of the response to the second voice input and the second portion of the response to the second voice input.

3. The system of claim 1, wherein the voice input is a first input comprising a first voice command, the system further comprising program instructions stored on the at least one non-transitory computer-readable medium that are executable by the at least one processor such that the system is configured to:
determine that the first playback device or the second playback device has detected a second voice input comprising a second voice command via at least one microphone of the first playback device or the second playback device;
determine (i) a first portion of a response to the second voice input and (ii) a second portion of the response to the second voice input;
cause the first playback device to perform the first portion of the response to the second voice input;
determine that the first playback device is not configured to perform the second portion of the response to the second voice input;
determine that the second playback device is configured to perform the second portion of the response to the voice input; and cause the second playback device to perform the second portion of the response to the second voice input.

4. The system of claim 1, wherein the media playback system further comprises a third playback device, and wherein the fallback device is the third playback device.

5. The system of claim 1, wherein the media playback system is a first media playback system, and wherein the fallback device is a third playback device of a second media playback system.

6. The system of claim 1, wherein the program instructions that are executable by the at least one processor such that the system is configured to determine that the first playback device is not configured to perform the second portion of the response to the voice input comprise program instructions that are executable by the at least one processor such that the system is configured to determine that the first playback device is one of (i) muted, (ii) in a do not interrupt state, or (iii) in a power save mode.

7. The system of claim 1, wherein the first portion of the response to the voice input is one or more of (i) an audio response, (ii) a visual response, or (iii) a haptic response.

8. A non-transitory computer-readable medium, wherein the non-transitory computer-readable medium is provisioned with program instructions that, when executed by at least one processor, cause a system to:
    determine that a first playback device has detected a voice input comprising a voice command via at least one microphone of the first playback device, wherein the first playback device is configured to receive voice commands for a media playback system comprising the first playback device and a second playback device;
    determine (i) a first portion of a response to the voice input comprising the command and (ii) a second portion of the response to the voice input comprising the command;
    cause the first playback device to perform the first portion of the response to the voice input;
    determine that the first playback device is not configured to perform the second portion of the response to the voice input;
    determine that the second playback device is configured to perform the second portion of the response to the voice input; and
    cause the second playback device to perform the second portion of the response to the voice input by (i) determining that a fallback device is configured to perform the second portion of the response and (ii) causing the fallback device to perform the second portion of the response to the voice input.

9. The non-transitory computer-readable medium of claim 8, wherein the voice input is a first input comprising a first voice command, and wherein the non-transitory computer-readable medium is also provisioned with program instructions that, when executed by at least one processor, cause the system to:
    determine that the first playback device or the second playback device has detected a second voice input comprising a second voice command via at least one microphone of the first playback device or the second playback device;
    determine (i) a first portion of a response to the second voice input and (ii) a second portion of the response to the second voice input;
    determine that the first playback device is configured to perform the first portion of the response to the second voice input and the second portion of the response to the second voice input; and
    cause the first playback device to perform the first portion of the response to the second voice input and the second portion of the response to the second voice input.

10. The non-transitory computer-readable medium of claim 8, wherein the voice input is a first input comprising a first voice command, and wherein the non-transitory computer-readable medium is also provisioned with program instructions that, when executed by at least one processor, cause the system to:
    determine that the first playback device or the second playback device has detected a second voice input comprising a second voice command via at least one microphone of the first playback device or the second playback device;
    determine (i) a first portion of a response to the second voice input and (ii) a second portion of the response to the second voice input;
    cause the first playback device to perform the first portion of the response to the second voice input;
    determine that the first playback device is not configured to perform the second portion of the response to the second voice input;
    determine that the second playback device is configured to perform the second portion of the response to the voice input; and
    cause the second playback device to perform the second portion of the response to the second voice input.

11. The non-transitory computer-readable medium of claim 8, wherein the media playback system further comprises a third playback device, and wherein the fallback device is the third playback device.

12. The non-transitory computer-readable medium of claim 8, wherein the media playback system is a first media playback system, and wherein the fallback device is a third playback device of a second media playback system.

13. The non-transitory computer-readable medium of claim 8, wherein the program instructions that, when executed by at least one processor, cause the system to determine that the first playback device is not configured to perform the second portion of the response to the voice input comprise program instructions that, when executed by at least one processor, cause the system to determine that the first playback device is one of (i) muted, (ii) in a do not interrupt state, or (iii) in a power save mode.

14. The non-transitory computer-readable medium of claim 8, wherein the first portion of the response to the voice input is one or more of (i) an audio response, (ii) a visual response, or (iii) a haptic response.

15. A method implemented by a system, the method comprising:
    determining that a first playback device has detected a voice input comprising a voice command via at least one microphone of the first playback device, wherein the first playback device is configured to receive voice commands for a media playback system comprising the first playback device and a second playback device;
    determining (i) a first portion of a response to the voice input comprising the command and (ii) a second portion of the response to the voice input comprising the command;
    causing the first playback device to perform the first portion of the response to the voice input;
    determining that the first playback device is not configured to perform the second portion of the response to the voice input;

determining that the second playback device is configured to perform the second portion of the response to the voice input; and causing the second playback device to perform the second portion of the response to the voice input by (i) determining that a fallback device is configured to perform the second portion of the response and (ii) causing the fallback device to perform the second portion of the response to the voice input.

16. The method of claim 15, wherein the voice input is a first input comprising a first voice command, and wherein the method further comprises:

determining that the first playback device or the second playback device has detected a second voice input comprising a second voice command via at least one microphone of the first playback device or the second playback device;

determining (i) a first portion of the response to the second voice input and (ii) a second portion of the response to the second voice input;

determining that the first playback device is configured to perform the first portion of the response to the second voice input and the second portion of the response to the second voice input; and causing the first playback device to perform the first portion of the response to the second voice input and the second portion of the response to the second voice input.

17. The method of claim 15, wherein the voice input is a first input comprising a first voice command, and wherein the method further comprises:

determining that the first playback device or the second playback device has detected a second voice input comprising a second voice command via at least one microphone of the first playback device or the second playback device;

determining (i) a first portion of the response to the second voice input and (ii) a second portion of the response to the second voice input;

causing the first playback device to perform the first portion of the response to the second voice input;

determining that the first playback device is not configured to perform the second portion of the response to the second voice input;

determining that the second playback device is configured to perform the second portion of the response to the voice input; and causing the second playback device to perform the second portion of the response to the second voice input.

* * * * *